United States Patent
Okudaira et al.

(10) Patent No.: US 11,990,802 B2
(45) Date of Patent: May 21, 2024

(54) MANUFACTURING APPARATUS AND MANUFACTURING METHOD FOR LAMINATED IRON CORE

(71) Applicant: Kuroda Precision Industries Ltd., Kanagawa (JP)

(72) Inventors: Hironobu Okudaira, Kanagawa (JP); Hideo Horii, Nagano (JP); Kenichi Shindo, Tokyo (JP)

(73) Assignee: Kuroda Precision Industries Ltd., Kanagawa (JP)

( * ) Notice: Subject to any disclaimer, the term of this patent is extended or adjusted under 35 U.S.C. 154(b) by 215 days.

(21) Appl. No.: 16/966,526

(22) PCT Filed: Mar. 21, 2018

(86) PCT No.: PCT/JP2018/011233
§ 371 (c)(1),
(2) Date: Jul. 31, 2020

(87) PCT Pub. No.: WO2019/180856
PCT Pub. Date: Sep. 26, 2019

(65) Prior Publication Data
US 2021/0057969 A1 Feb. 25, 2021

(51) Int. Cl.
*H02K 15/02* (2006.01)
*B21D 28/02* (2006.01)
(Continued)

(52) U.S. Cl.
CPC ............ *H02K 15/02* (2013.01); *B21D 28/02* (2013.01); *H01F 41/0233* (2013.01); *B32B 38/0004* (2013.01)

(58) Field of Classification Search
CPC ........ H02K 15/02; B21D 28/02; B21D 28/06; B21D 43/22; H01F 41/0233; H01F 41/024; H01F 41/02; B32B 38/0004
See application file for complete search history.

(56) References Cited

U.S. PATENT DOCUMENTS

| | | | |
|---|---|---|---|
| 2011/0232076 A1* | 9/2011 | Matsubara | B21D 28/06 29/564 |
| 2015/0097463 A1 | 4/2015 | Blocher et al. | |
| 2017/0297078 A1 | 10/2017 | Nishinaka | |

FOREIGN PATENT DOCUMENTS

| | | |
|---|---|---|
| DE | 102012005795 | 9/2013 |
| JP | 2001321850 | 11/2001 |

(Continued)

OTHER PUBLICATIONS

Machine Translation of JP2015076970 (Year: 2015).*

(Continued)

*Primary Examiner* — George R Koch
*Assistant Examiner* — Christopher C Caillouet
(74) *Attorney, Agent, or Firm* — Dority & Manning, PA

(57) ABSTRACT

To prevent an adhesive agent from adhering to a die set for outer shape punching and avoid contamination of the die set by the adhesive agent even if the adhesive agent protrudes from the outer shape contour of a laminated iron core, a laminated iron core manufacturing device includes: a first punch (32) and a first die (48) for punching a part of an outer shape of each iron core lamina in a sheet steel strip; an adhesive agent applying apparatus (60) configured to apply an adhesive agent on an adhesive agent application region including a portion defined in the sheet steel strip by punching by the first punch (32) and the first die 48; and a second punch (34) and a second die (50) configured to punch the outer shape of each iron core lamina other than the part punched by the first punch (32) and the first die (48) from the sheet steel strip.

7 Claims, 27 Drawing Sheets

(A)

(B)

(51) Int. Cl.
*H01F 41/02* (2006.01)
*B32B 38/00* (2006.01)

(56) References Cited

FOREIGN PATENT DOCUMENTS

| | | | | |
|---|---|---|---|---|
| JP | 2002151339 | | 5/2002 | |
| JP | 2007324455 | | 12/2007 | |
| JP | 2009124828 | | 6/2009 | |
| JP | 2015076970 | | 4/2015 | |
| WO | WO 2016017897 | * | 2/2016 | ............. H02K 15/02 |

OTHER PUBLICATIONS

Machine Translation of JP2007032445 (Year: 2007).*
PE2E Machine Translation of WO 2015017897 (Year: 2016).*
International Search Report for PCT/JP2018/011233 dated Jun. 12, 2018, 4 pages.
German Office Action (w/ English translation) for corresponding Application No. DE112018006953.2, dated May 19, 2022, 15 pages.

* cited by examiner

Fig.1
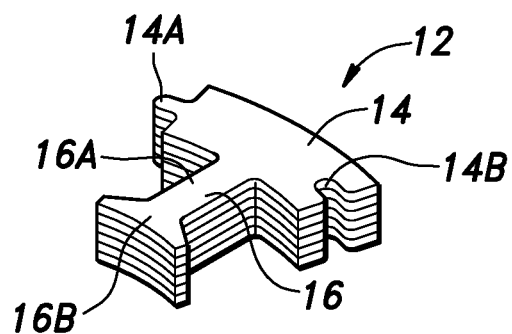
(A)
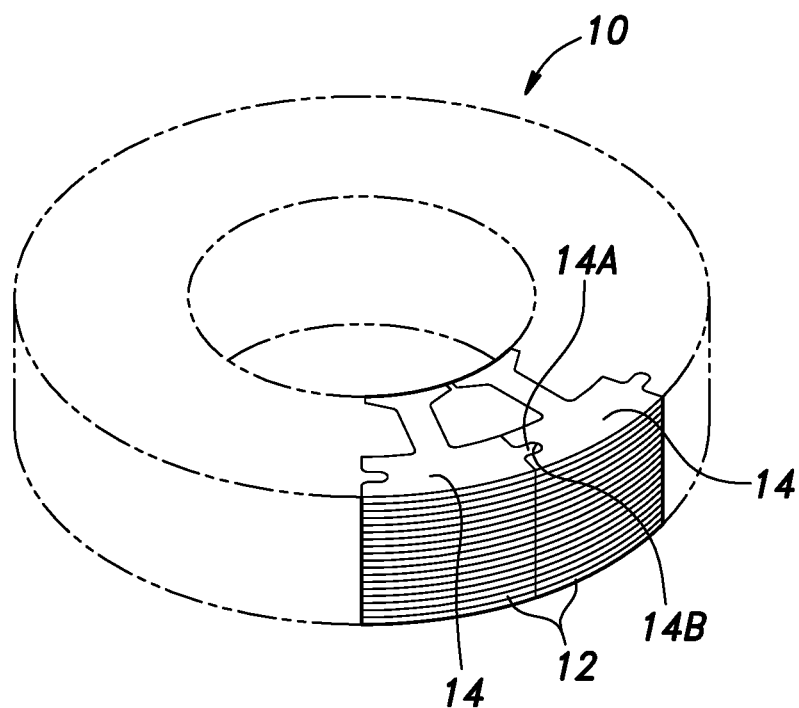
(B)

Fig.9
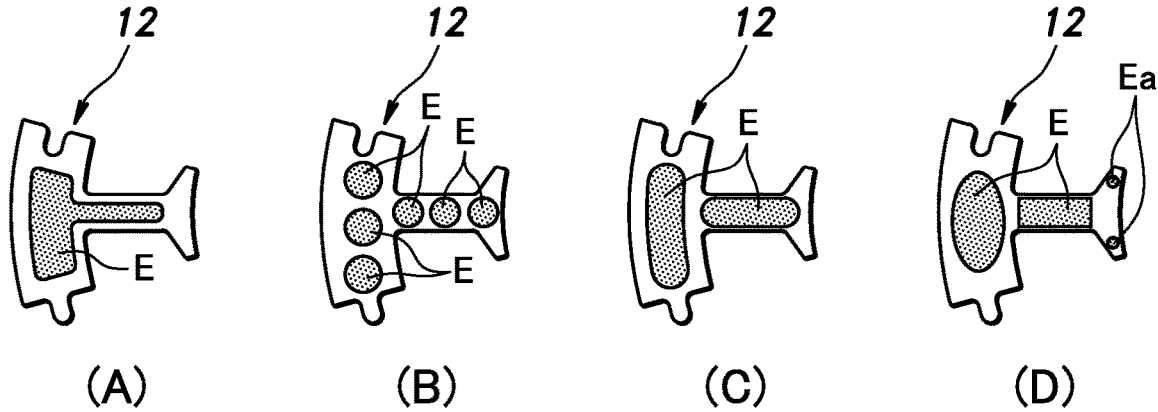
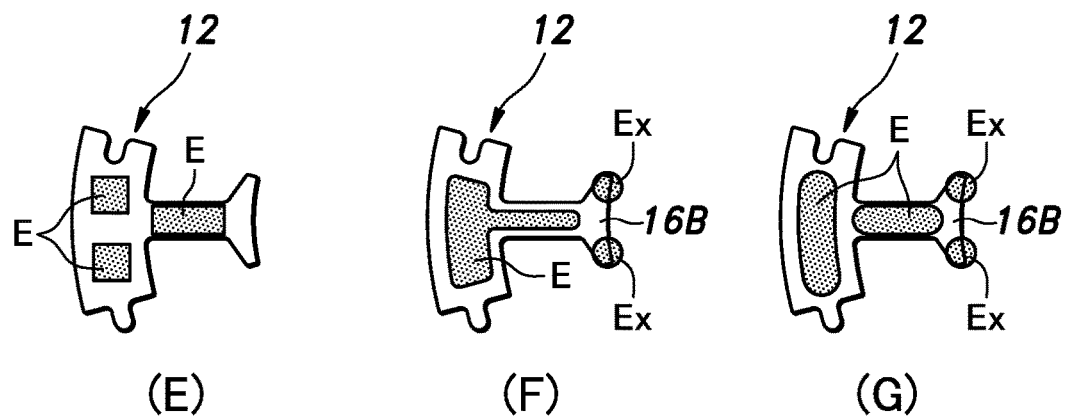
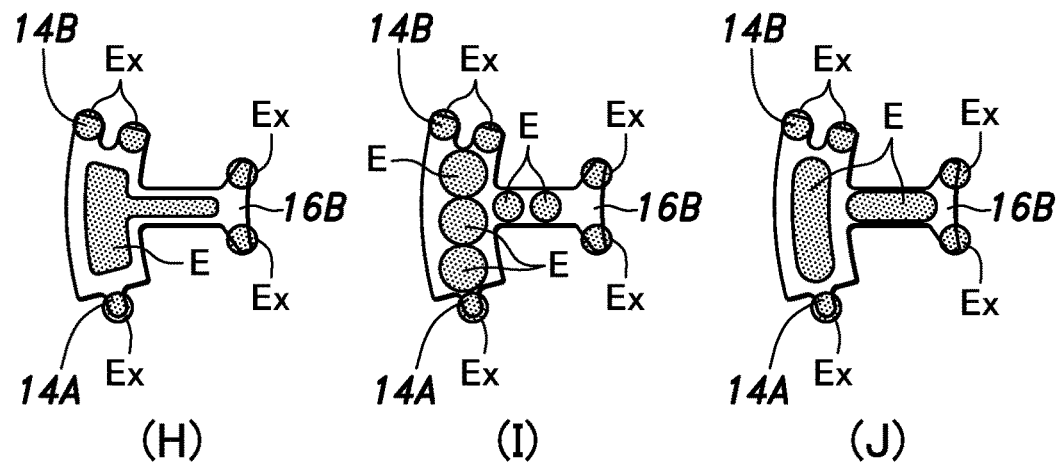

MANUFACTURING APPARATUS AND MANUFACTURING METHOD FOR LAMINATED IRON CORE

CROSS REFERENCE TO RELATED APPLICATIONS

This application is the U.S. National Stage entry of International Application Number PCT/JP2018/011233 filed under the Patent Cooperation Treaty having a filing date of Mar. 21, 2018, which is incorporated herein by reference.

TECHNICAL FIELD

The present invention relates to a manufacturing apparatus and a manufacturing method for a laminated iron core, and more specifically, to a manufacturing apparatus and a manufacturing method for a laminated iron core formed by stacking and bonding multiple iron core laminae by means of an adhesive agent.

BACKGROUND ART

As a laminated iron core used in a stator and a rotor of a rotary electric machine, there is known a laminated iron core formed by sequentially stacking iron core laminae punched from a sheet steel strip that is intermittently conveyed by a progressive die including multiple punching dies each formed by a punch and a die and bonding adjacent iron core laminae to each other by an adhesive agent (Patent Documents 1 to 3).

PRIOR ART DOCUMENT(S)

Patent Document(s)

Patent Document 1: JP2001-321850A
Patent Document 2: JP2002-151339A
Patent Document 3: JP2009-124828A

SUMMARY OF THE INVENTION

Task to be Accomplished by the Invention

In the laminated iron core that is made by bonding the iron core laminae to each other with the adhesive agent, it is preferred that the adhesive layer extends to a region near the contour of the outer shape of the laminated iron core in order to secure a stable stacked state. However, if the adhesive agent protrudes outside the contour of the outer shape of the laminated iron core, the adhesive agent may adhere to the die set for outer shape punching of the laminated iron core that is performed after applying the adhesive agent, and this may result in fixation of the adhesive agent to the die set and/or cause contamination such that the normal operation of the die set may be impaired.

In particular, when the adhesive layer is provided on a fine portion, such as a tooth portion that forms a magnetic pole protruding in the radial direction from an annular yoke portion, it is difficult to apply the adhesive agent on the fine portion such that the adhesive agent does not protrude from the outer shape contour of the fine portion, and there is a limit to providing the adhesive layer on the fine portion.

An object to be achieved by the present invention is to prevent an adhesive agent from adhering to the die set for outer shape punching and to avoid the contamination of the die set by the adhesive agent even if the adhesive agent protrudes outside the outer shape contour of the laminated iron core.

Means to Accomplish the Task

A manufacturing apparatus for a laminated iron core according to one embodiment of the present invention is a manufacturing apparatus for a laminated iron core formed by stacking and adhesively bonding iron core laminae each formed by punching an intermittently conveyed sheet steel strip into a predetermined shape, the manufacturing apparatus comprising: a first punch and a first die configured to punch a part of an outer shape of each iron core lamina in the sheet steel strip; an adhesive agent applying apparatus configured to apply an adhesive agent on an adhesive agent application region including a portion defined in the sheet steel strip by punching by the first punch and the first die; and a second punch and a second die configured to punch the outer shape of each iron core lamina other than the part punched by the first punch and the first die from the sheet steel strip.

According to this configuration, even if the adhesive agent protrudes outside the outer shape contour of the laminated iron core, the adhesive agent is prevented from adhering to the second die and the second die is not contaminated by the adhesive agent. This effect of avoiding contamination can be obtained both when the protruding of the adhesive agent occurs in the step of applying the adhesive agent and when the protruding of the adhesive agent occurs in the step of outer shape punching by the second punch and the second die.

In the aforementioned manufacturing apparatus for a laminated iron core, the adhesive agent application region includes a contour of the outer shape of each iron core lamina, and the first punch and the first die are configured to punch a part of the outer shape of each iron core lamina adjacent to the adhesive agent application region.

According to this configuration, even when the adhesive agent application region includes the contour of the outer shape of the iron core lamina, the adhesion of the adhesive agent to the second die is avoided and the second die is not contaminated by the adhesive agent.

In the aforementioned manufacturing apparatus for a laminated iron core, preferably, the second die is arranged below the second punch, the manufacturing apparatus further comprises a squeeze ring arranged below the second die to hold the iron core laminae punched by the second punch and the second die in a stacked state, and the squeeze ring is provided with a recess for defining a space between the outer shape of each iron core lamina and the squeeze ring at a portion corresponding to the punching of the outer shape of each iron core lamina by the first punch and the first die.

According to this configuration, the adhesive agent is prevented from adhering to the squeeze ring and the squeeze ring is not contaminated by the adhesive agent.

In the aforementioned manufacturing apparatus for the laminated iron core, preferably, the manufacturing apparatus further comprises a stripper plate configured to come into contact with an upper surface of the sheet steel strip to perform a stripping action, wherein the stripper plate has a recess formed at a position corresponding to the adhesive agent application region of the sheet steel strip.

According to this configuration, the adhesive agent is prevented from adhering to the stripper plate and the stripper plate is not contaminated by the adhesive agent.

A manufacturing method for a laminated iron core according to one embodiment of the present invention is a manufacturing method for a laminated iron core formed by stacking and adhesively bonding iron core laminae each formed by punching an intermittently conveyed sheet steel strip into a predetermined shape, the manufacturing method comprising: a first outer shape punching step of punching a part of an outer shape of each iron core lamina in the sheet steel strip with a die set; an adhesive agent applying step of applying an adhesive agent on an adhesive agent application region including a portion defined in the sheet steel strip by punching by the first outer shape punching step; and a second outer shape punching step of, after the adhesive agent applying step, punching, with a die set, the outer shape of each iron core lamina other than the part punched by the first outer shape punching step from the sheet steel strip.

According to this manufacturing method, even if the adhesive agent protrudes outside the outer shape contour of the laminated iron core, the die set for the second outer shape punching step is not contaminated by the adhesive agent.

In the manufacturing method for a laminated iron core according to one embodiment of the present invention, the adhesive agent application region includes a contour of the outer shape of each iron core lamina, and the first outer shape punching step punches a part of the outer shape of each iron core lamina adjacent to the adhesive agent application region.

According to this manufacturing method, even when the adhesive agent application region includes the contour of the outer shape of the iron core lamina, the die set for the second outer shape punching step is not contaminated by the adhesive agent.

In the manufacturing method for a laminated iron core according to one embodiment of the present invention, the adhesive agent application region includes a part that protrudes outside the contour of the outer shape of each iron core lamina in the second outer shape punching step, and the first outer shape punching step punches a part of the outer shape of each iron core lamina adjacent to the adhesive agent application region.

According to this manufacturing method, even if the adhesive agent protrudes outside the outer shape contour of the laminated iron in the second outer shape punching step, the die set for the second outer shape punching step is not contaminated by the adhesive agent.

Effect of the Invention

According to the manufacturing apparatus and the manufacturing method for a laminated iron core of the present invention, even if the adhesive agent protrudes outside the outer shape contour of the laminated iron core, the adhesive agent is prevented from adhering to the die set for the outer shape punching and the contamination of the die set by the adhesive agent is avoided.

BRIEF DESCRIPTION OF THE DRAWINGS

FIG. 1 is a perspective view showing an embodiment of a laminated iron core manufactured by a manufacturing apparatus according to the present invention;

FIG. 9 includes plan views showing examples of setting of the adhesive agent application regions in the divided core piece;

MODES FOR CARRYING OUT THE INVENTION

Figure 2:
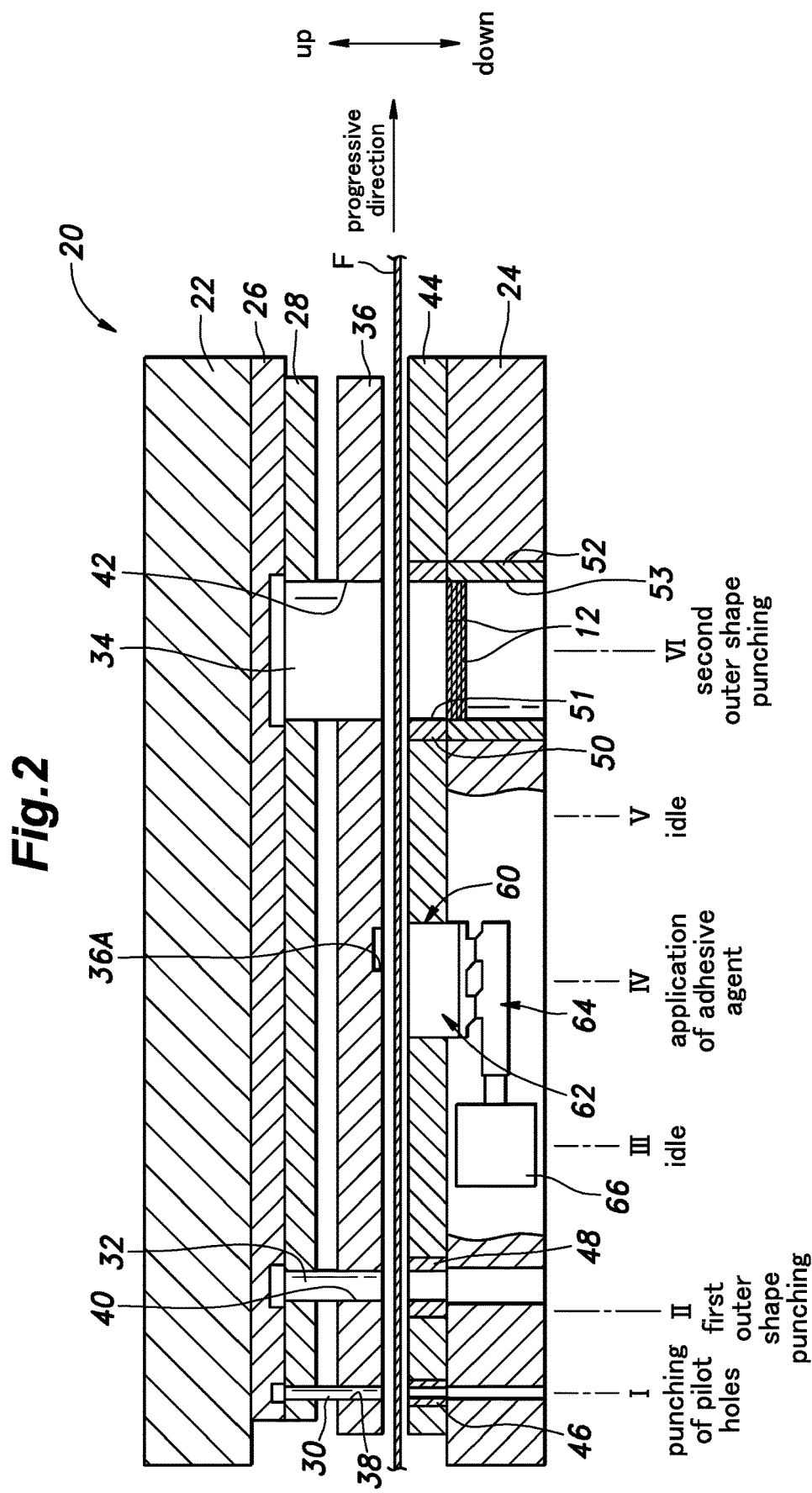
FIG. 2 is a sectional view showing an embodiment of the manufacturing apparatus for a laminated iron core according to the present invention.

Preferred embodiments of the present invention will be described with reference to the accompanying drawings.

First, one embodiment of a laminated iron core manufactured by a manufacturing apparatus and a manufacturing method for a laminated iron core according to an embodiment will be described with reference to FIGS. 1(A) and 1(B).

As shown in FIG. 1(A), a laminated iron core 10 of the present embodiment is for a stator, and is composed of a combination of multiple divided core pieces 12. Each divided core piece 12 includes an arc-shaped yoke portion 14 and a tooth portion 16 extending radially inward from an intermediate portion of the yoke portion 14 and is substantially T-shaped.

A projection 14A is formed at one end of each yoke portion 14 and a recess 14B configured to fit into the projection 14A of an adjacent yoke portion 14 is formed at the other end of each yoke portion 14. As shown in FIG. 1(B), the projection 14A and the recess 14B are engaged with each other so that the adjacent yoke portions 14 are coupled to each other, whereby multiple yoke portions 14 form an annular yoke portion.

Each tooth portion 16 includes a radially extending portion 16A which extends radially and on which a wire is to be wound and a circumferentially extending portion 16B that extends circumferentially from both sides of the tip of the radially extending portion 16A.

Next, a manufacturing apparatus and a manufacturing method for the laminated iron core according to the present embodiment will be described with reference to FIGS. 2 to 5.

As shown in FIG. 2, a manufacturing apparatus 20 employs a progressive die system and includes a pilot hole punching station I, a first outer shape punching station II, an idle station III, an adhesive agent applying station IV, an idle station V, and a second outer shape punching station VI in order in a progressive direction. The stations I, II, IV, and VI other than the idle stations III and V execute respective steps in accordance with the intermittent conveyance of a sheet steel strip (hereinafter referred to as a strip) F in the progressive direction. In the idle stations III and V, idle feeding of the strip F is performed.

The manufacturing apparatus 20 includes a plate-like upper die holder 22 fixed to the lower surface of an upper ram (not shown) of a press machine and a plate-like lower die holder 24 fixed to the upper surface a lower table (not shown) of the same press machine so as to directly face the upper die holder 22.

Punches 30 for pilot hole punching, a punch 32 for first outer shape punching (first punch), and a punch 34 for second outer shape punching (second punch) are attached on the lower side of the upper die holder 22 at positions corresponding to the stations I, II, and VI by a back plate 26 and a punch plate 28.

A plate-like stripper plate 36 is supported at a place below the upper die holder 22 by hanging bolts (not shown) so as to be displaceable in the vertical direction. The stripper plate 36 is configured to come into contact with the upper surface of the strip F to perform a stripping action and is provided with punch holes 38, 40, 42 through which the punches 30, 32, 34 pass.

A plate-like die plate 44 is attached to the upper surface of the lower die holder 24. Dies 46 for pilot hole punching, a die 48 for first outer shape punching (first die), and a die 50 for second outer shape punching (second die) are attached to the die plate 44 at positions corresponding to the punching stations I, II, and VI.

The punches 30 for pilot hole punching and the respective dies 46 for pilot hole punching, the punch 32 for first outer shape punching and the die 48 for first outer shape punching, and the punch 34 for second outer shape punching and the die 50 for second outer shape punching each correspond to each other and form a die set.

A squeeze ring 52 is attached to the lower die holder 24 at a position concentric with the die 50 for second outer shape punching. The squeeze ring 52 has a squeeze hole 53 continuous with a die hole 51 of the die 50 for second outer shape punching, and holds the divided core pieces 12 punched from the strip F in the squeeze hole 53 in the vertically stacked state.

An adhesive agent applying apparatus 60 is provided in a part of the die plate 44 corresponding to the adhesive agent applying station IV. The adhesive agent applying apparatus 60 is of a transfer type and includes an application table 62 and a cam mechanism 64. The cam mechanism 64 is driven by a driving apparatus 66 and moves the application table 62 between a raised position and a lowered position. When in the raised position, the application table 62 transfers (applies) an adhesive agent B (see FIG. 4) on adhesive agent application regions E set at multiple locations on the bottom surface of the strip F for each pressing operation except for when forming a divided core piece for separation to set the number of the divided core pieces 12 to be stacked.

Figure 3:
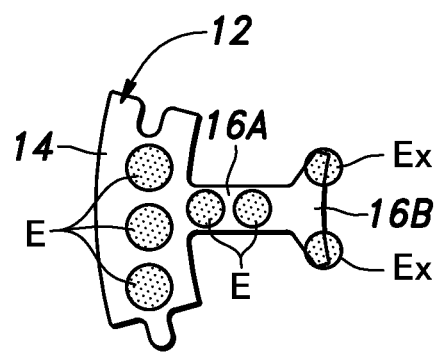
FIG. 3 is a plan view showing an example of setting of adhesive agent application regions in a divided core piece.

As shown in FIG. 3, the adhesive agent application regions E each have a round shape, and for each divided core piece 12 punched from the strip F, are set at three positions on the yoke portion 14, at two positions on the radially extending portion 16A, and at two positions on respective tips of the circumferentially extending portion 16B. Each of the adhesive agent application regions E on the circumferentially extending portion 16B includes an outer shape contour of the corresponding tip portion of the circumferentially extending portion 16B and also includes a part that protrudes outside the outer shape contour. Each adhesive agent application region E including the outer shape contour will be hereinafter referred to as an adhesive agent application region Ex.

Figure 4:
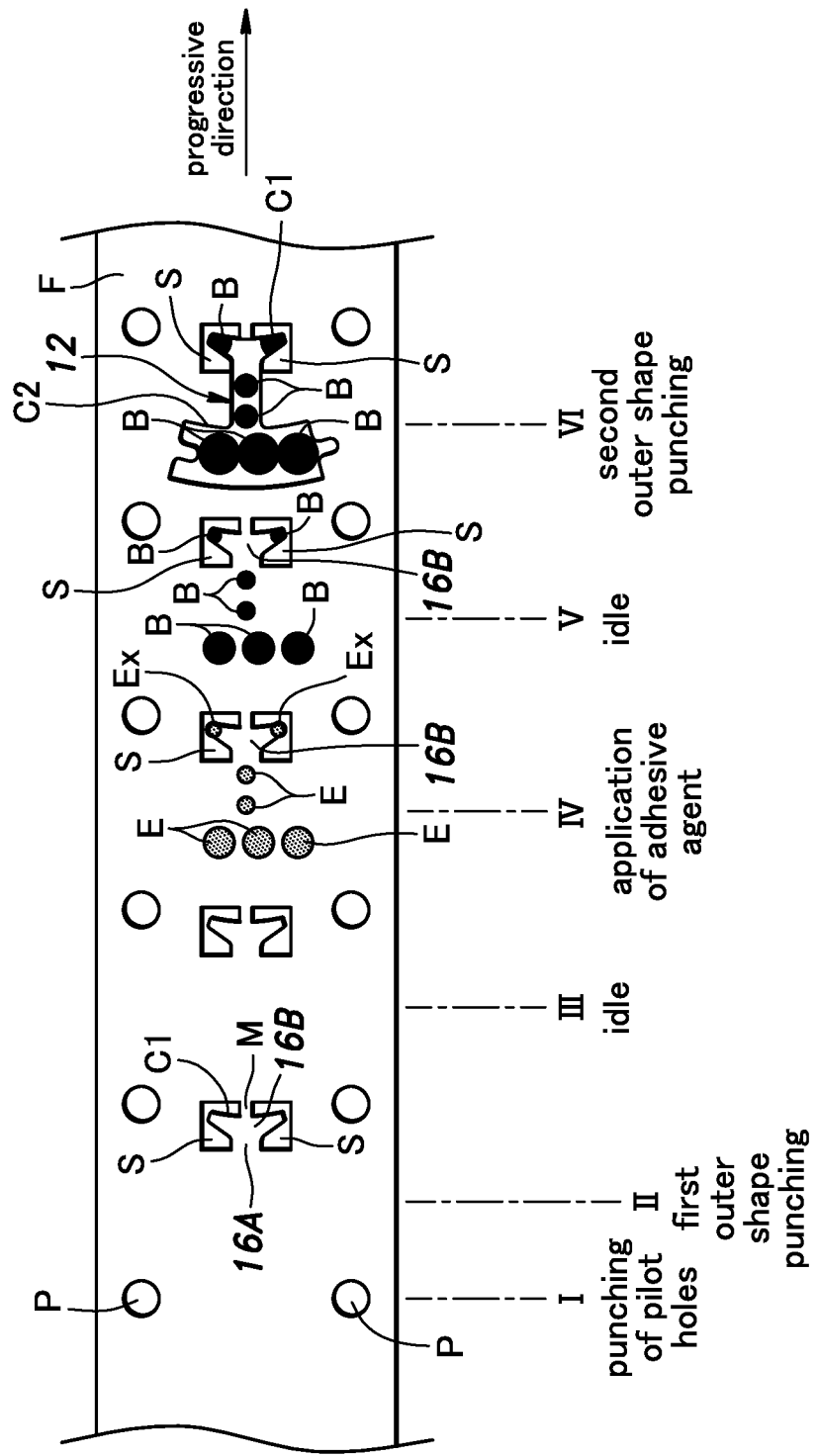
FIG. 4 is an explanatory diagram showing a manufacturing process of a laminated iron core according to the embodiment.

In the pilot hole punching station I, the pilot holes P are punched in the strip F as shown in FIG. 4 by the punches 30 for pilot hole punching and the dies 46 for pilot hole punching for each press operation, in other words, for each intermittent conveyance of the strip F. The pilot holes P are formed near the edge portions on both sides (both of left and right sides) with respect to the direction (progressive direction) in which the strip F is conveyed in an intermittent manner.

In the first outer shape punching station II, as a first outer shape punching step, parts on the outside of a portion corresponding to the circumferentially extending portion 16B and the part of the radially extending portion 16A adjacent thereto are punched out in the shape as shown in FIG. 4 by the punch 32 for first outer shape punching and the die 48 for first outer shape punching for each intermittent conveyance of the strip F, whereby a portion corresponding to an outer shape C1 of the circumferentially extending portion 16B and the part of the radially extending portion 16A adjacent thereto is formed in the strip F.

By this punching, prior to an adhesive agent applying step, spaces S are formed in the strip F on the outside of the portion corresponding to the circumferentially extending portion 16B and the part of the radially extending portion 16A adjacent thereto. Note that this punching is performed to leave a narrow bridge portion M connecting the circumferentially extending portion 16B and the strip F so that the tooth portion 16 is prevented from unstably moving vertically.

In the adhesive agent applying station IV, as the adhesive agent applying step, the adhesive agent B is transferred to each adhesive agent application region E, Ex on the lower surface of the strip F in a substantially circular shape by the adhesive agent applying apparatus 60 in the raised position. Each adhesive agent application region Ex on the circumferentially extending portion 16B includes a portion protruding outside the outer shape contour of the circumferentially extending portion 16B, but the protruding portion is located in the corresponding space S and there is no application surface in this portion. Therefore, as shown in the idle station V, the transfer of the adhesive agent B to each adhesive agent application region Ex is not performed in the protruding portion and is performed in the region including the outer shape contour of the circumferentially extending portion 16B. The transfer of the adhesive agent B to each of the other adhesive agent application regions E is performed such that the transferred adhesive agent B has substantially the same shape as each adhesive agent application region E. Note that FIG. 4 shows the lower surface of the strip F so that the adhesive agent application regions E can be seen.

Note that when forming a divided core piece for separation to set the number of the iron core laminae (divided core pieces 12) to be stacked, which takes place every predetermined number of times of the intermittent conveyance, the adhesive agent applying apparatus 60 descends to the lowered position, and hence the application of the adhesive agent B to the strip F is suspended.

In the second outer shape punching station VI, as a second outer shape punching step, an entirety of an outer shape C2 of the divided core piece 12 including a part of the bridge portion M other than the outer shape C1 is punched out by the punch 34 for second outer shape punching and the die 50 for second outer shape punching, as shown in FIG. 4. Thereby, the divided core piece 12 is separated from the strip F.

Figure 5:
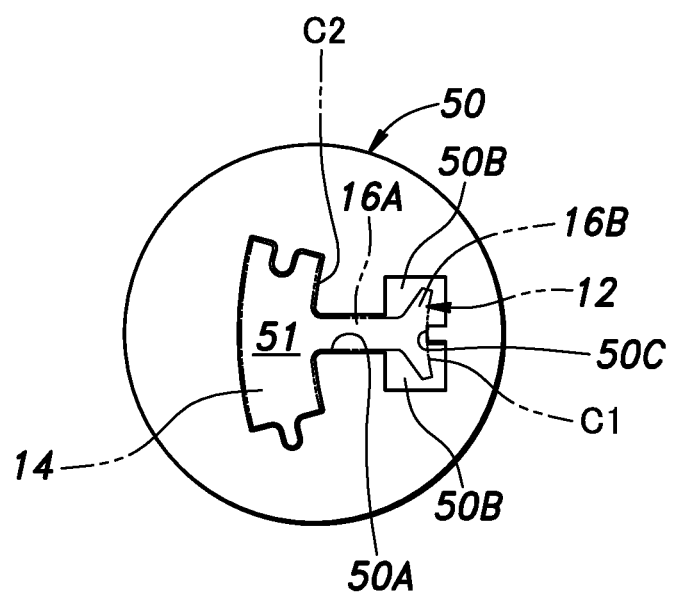
FIG. 5 is a plan view of a die for second outer shape punching used in the manufacturing apparatus according to the embodiment.

The die 50 for second outer shape punching has a die hole 51 vertically extending therethrough. As shown in FIG. 5, as viewed in plan view, the die 50 is provided, in a portion thereof defining the outer edge of the die hole 51, with a blade portion 50A having the same shape as the outer shape C2 of the divided core piece 12 other than the outer shape C1, recesses (non-blade portions) 50B provided at positions corresponding to the spaces S on the outside of the outer shape C1, and a blade portion 50C protruding into the die hole 51 to cut the bridge portion M.

Since the punch 34 for second outer shape punching and the die 50 for second outer shape punching are only required to punch the outer shape C2 of the divided core piece 12 excluding the outer shape C1, portions of the die 50 for second outer shape punching corresponding to the outer shape C1 are spaced from the outer shape C1 by the spaces S due to the recesses 50B.

Thereby, even if the adhesive agent B transferred to the adhesive agent application regions Ex on the circumferentially extending portion 16B adheres to an end surface of a portion of the outer shape C1 or protrudes outward from the outer edge of the circumferentially extending portion 16B, the adhesive agent B does not adhere to the die 50 for second outer shape punching, and the die 50 for second outer shape punching is not contaminated by the adhesive agent B.

As shown in FIG. 2, recesses 36A are formed in the lower surface of the stripper plate 36 at positions corresponding to the adhesive agent application regions Ex, in other words, at positions corresponding to portions of the circumferentially extending portion 16B where the adhesive agent B is transferred. The recesses 36A define escape spaces for avoiding adhesion of the adhesive agent B to the lower surface of the stripper plate 36 even if the adhesive agent B transferred to the circumferentially extending portion 16B adheres to an end surface of the circumferentially extending portion 16B or protrudes outward from the outer edge of the circumferentially extending portion 16B. This prevents the stripper plate 36 from being contaminated by the adhesive agent B. Note that recesses that perform a function similar to that of the recesses 36A may also be formed in a portion of the lower surface of the stripper plate 36 corresponding to the idle station V or in a tip end surface of the punch 34 for second outer shape punching.

Each divided core piece 12 separated from the strip F descends in the die hole 51 and enters the squeeze hole 53 of the squeeze ring 52.

Figure 6:
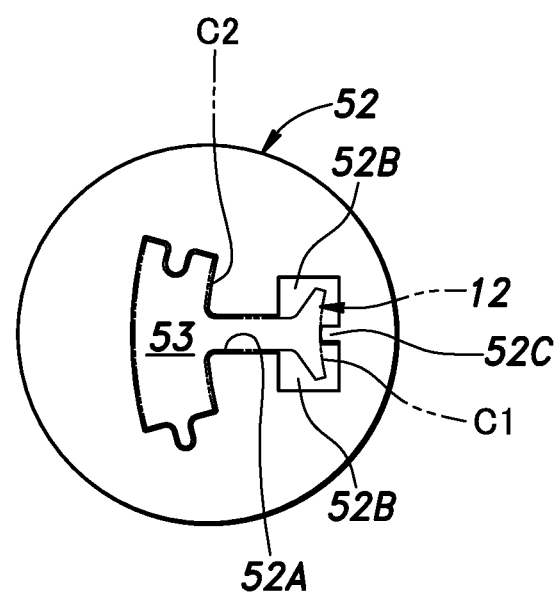
FIG. 6 is a plan view of a squeeze ring used in the manufacturing apparatus according to the present embodiment.

The squeeze ring 52 has a squeeze hole 53 vertically extending therethrough. As shown in FIG. 6, as viewed in plan view, the squeeze ring 52 is provided, in a portion thereof defining an outer edge of the squeeze hole 53, with a divided core piece holding portion 52A having a shape substantially the same as that of the die hole 51 but slightly smaller than the shape of a part of the outer shape C2 of the divided core piece 12, recesses 52B each being defined in the position of the corresponding space S punched by the punch 32 for first outer shape punching and the die 48 for first outer shape punching and having substantially the same shape as the space S, and a protrusion 52C configured to come into contact with the outer shape C1 of the divided core piece 12.

The squeeze ring 52 holds each divided core piece 12 in the squeeze hole 53 owing to the divided core piece holding portion 52A. As multiple divided core pieces 12 successively enter the squeeze hole 53, the divided core pieces 12 are stacked with vertically adjoining ones being pressed against each other.

As the adjoining divided core pieces 12 are pressed against each other, the adhesive agent B transferred to each of the adhesive agent application regions E and Ex is caused to spread to form an adhesive layer having a predetermined thickness, as shown in the outer shape punching station VI in FIG. 4. Thereby, in the circumferentially extending portion 16B, an adhesive layer of the adhesive agent B is formed over the entire surface thereof so that a high bond strength is obtained in the circumferentially extending portion 16B even when it is small.

Since the squeeze ring 52 is formed with the recesses 52B, the portion thereof corresponding to the outer shape C1 is spaced from the outer shape C1 owing to the recesses 52B. Thereby, even if the adhesive agent B transferred to the circumferentially extending portion 16B adheres to an end surface at an outer edge of the circumferentially extending portion 16B or protrudes outward from the outer edge, the adhesive agent B is prevented from adhering to the squeeze ring 52 and the squeeze ring 52 is not contaminated by the adhesive agent B.

Since the protrusion 52C is in contact with the outer shape C1 of each divided core piece 12, the circumferentially extending portion 16B does not unstably move vertically in the squeeze hole 53 even though the portion corresponding to the outer shape C1 is spaced from the squeeze ring 52 due to the recesses 52B.

The stack of the divided core pieces 12 is taken out from the lower end of the squeeze hole 53 to the outside, and a post-stacking process for heat-curing the adhesive agent is carried out, if necessary.

Next, details of the adhesive agent applying apparatus 60 will be described with reference to FIGS. 7 and 8.

The application table 62 of the adhesive agent applying apparatus 60 is composed of a connected body of the upper block 62A and the lower block 62B, and is vertically movably inserted into a holding hole 68 formed in the lower die holder 24 and the die plate 44.

The cam mechanism 64 is provided below the application table 62. The cam mechanism 64 includes a fixed cam 74 formed by a plate cam fixed to the bottom portion of the lower block 62B, and a moving cam 76 formed by a plate cam provided on the bottom portion of the lower block 62B so as to be movable in the left and right directions as seen in FIG. 7. The moving cam 76 is connected to the driving apparatus 66 and is driven in a reciprocating manner by the driving apparatus 66 in the left and right direction as seen in FIG. 7. The fixed cam 74 includes a sawtooth-shaped portion having sawtooth protrusions 74A and sawtooth recesses 74B arranged alternately in the left and right direction on the lower surface thereof, and the moving cam 76 includes sawtooth protrusions 76A and sawtooth recesses 76B arranged alternately on the upper surface thereof.

Figure 7:
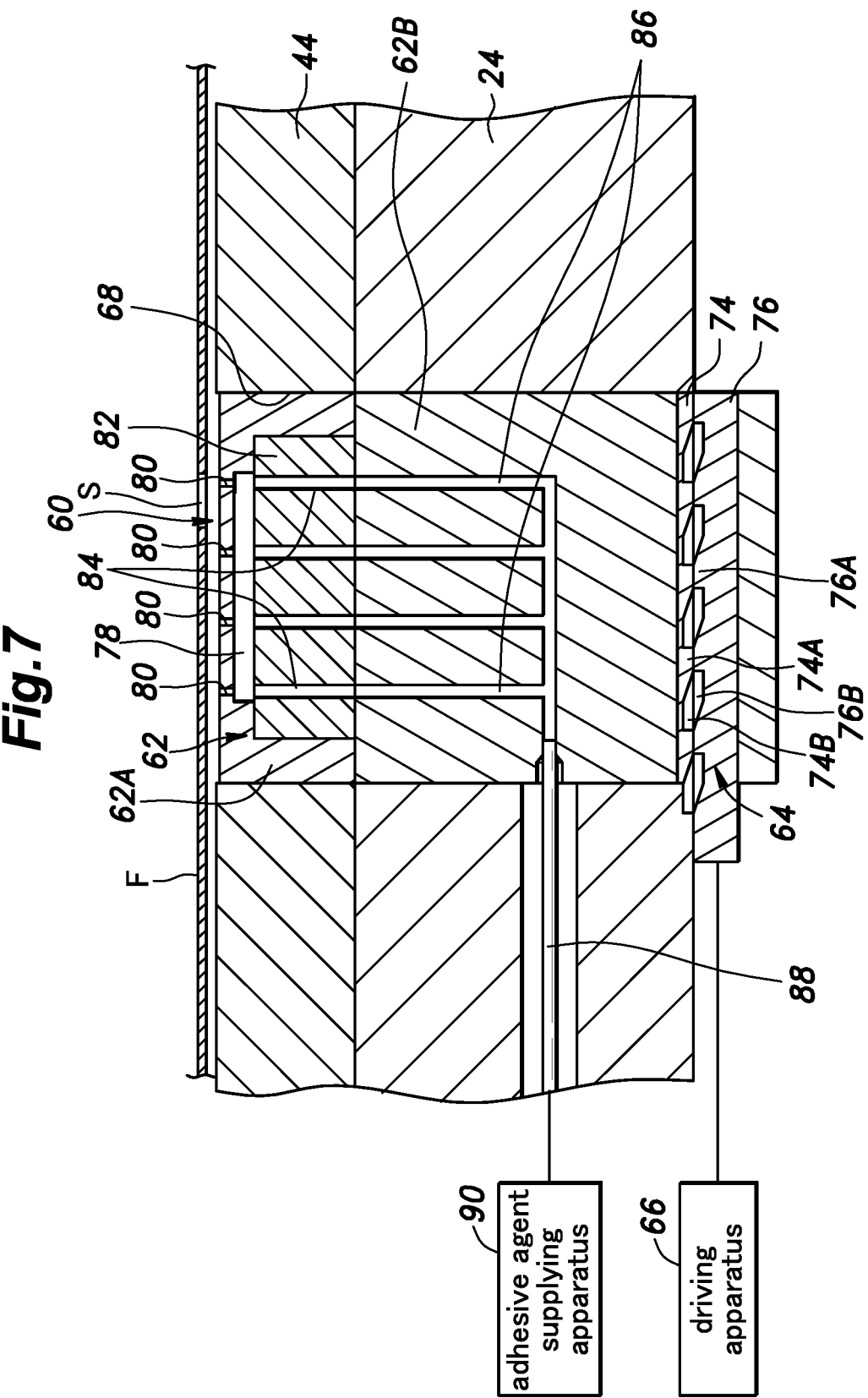
FIG. 7 is a sectional view of an adhesive agent applying apparatus used in the manufacturing apparatus according to the embodiment.
Figure 8:
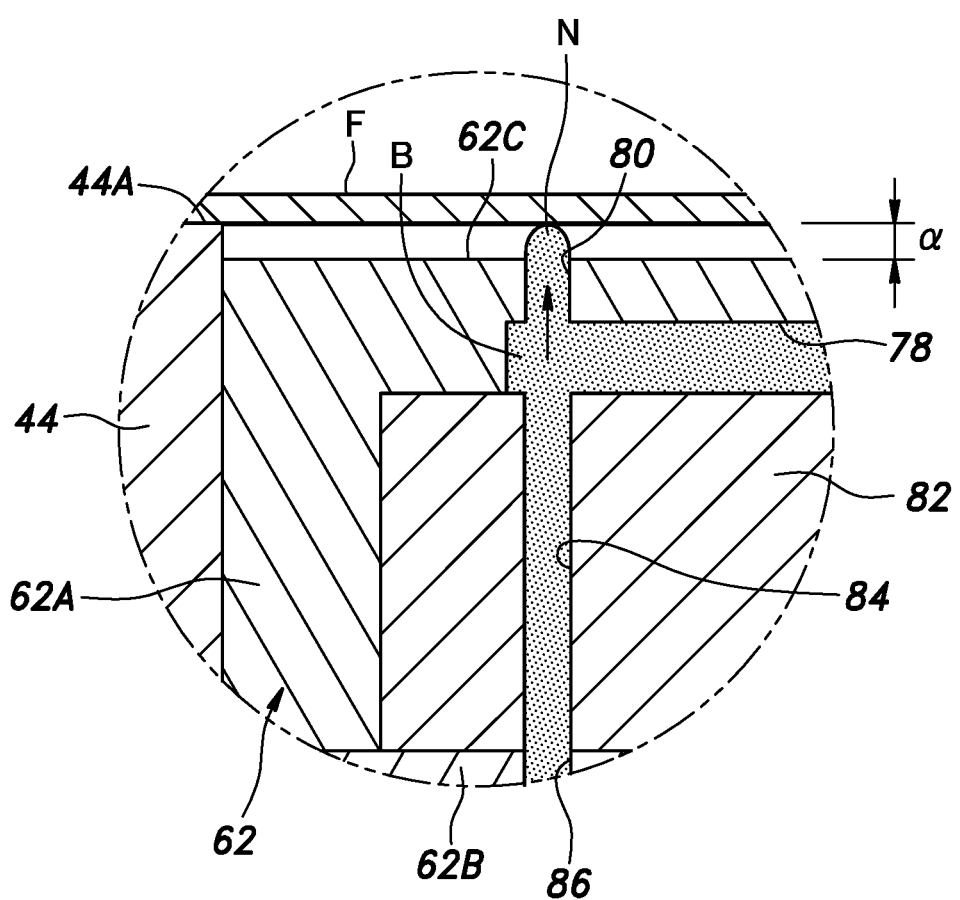
FIG. 8 is an enlarged sectional view of a main part of the adhesive agent applying apparatus.

As shown in FIG. 7, when the moving cam 76 is in a position in which the sawtooth protrusions 74A of the fixed cam 74 and the sawtooth protrusions 76A of the moving cam 76 are aligned with each other, the application table 62 is placed in the raised position (transfer position). In the raised position (transfer position), as shown in FIG. 8, an upper surface 62C of the upper block 62A is located below the upper surface 44A of the die plate 44 by a level difference $\alpha$.

When the moving cam 76 is driven to the left as seen in FIG. 7 by the driving apparatus 66 and the moving cam 76 is placed in a position in which the sawtooth recesses 74B of the fixed cam 74 and the sawtooth protrusions 76A of the moving cam 76 are aligned with each other, the application table 62 and the fixed cam 74 descend (retreat downward), and the application table 62 is placed in the lowered position. In the lowered position (non-transfer position), the upper surface 62C of the upper block 62A is located below the upper surface 44A of the die plate 44 by a large level difference that is larger than the level difference $\alpha$.

The upper block 62A is provided with an adhesive agent accumulation portion 78 and a plurality of discharge holes 80 each consisting of a round hole extending from the adhesive agent accumulation portion 78 to the horizontal upper surface 62C of the upper block 62A in the up-down direction (vertical direction) so as to be opened in the upper surface 62C. The discharge holes 80 are placed in positions corresponding to the adhesive agent application regions E of the strip F located in the adhesive agent applying station IV.

An inner block 82 is attached in the upper block 62A. The inner block 82 and the lower block 62B are formed with multiple adhesive agent supplying passages 84 and 86 for supplying the adhesive agent to the adhesive agent accumulation portion 78. A flexible adhesive agent supplying tube 88 is connected to each adhesive agent supplying passage 86. The adhesive agent supplying tube 88 is connected to the adhesive agent supplying apparatus 90. The adhesive agent supplying apparatus 90 pressurizes the adhesive agent to a predetermined pressure, and supplies the pressurized adhesive agent B to the adhesive agent accumulation portion 78 with a predetermined flow rate via the adhesive agent supplying tube 88 and the adhesive agent supplying passages 86, 84. Thereby, the adhesive agent B is constantly supplied to each of the discharge holes 80 from the adhesive agent accumulation portion 78 with a predetermined pressure.

Note that in the present embodiment, multiple adhesive agent supplying passages 84 and 86 for supplying the adhesive agent B to the adhesive agent accumulation portion 78 are provided. The number and the supplying positions of these passages only need to be a number and supplying positions that are necessary to ensure the supply amount of the adhesive agent for maintaining the pressure of the adhesive agent at an appropriate pressure over the entire area of the adhesive agent accumulation portion 78.

The adhesive agent B in the adhesive agent accumulation portion 78 is discharged from each of the discharge holes 80 to a point above the application table 62. Since the pressure of the adhesive agent B in the adhesive agent accumulation portion 78 is maintained at a predetermined value and the adhesive agent B has a predetermined viscosity, the adhesive agent B discharged to the outside from each discharge hole 80 constantly forms a bulging portion N that is bulging above the upper surface 62C of the upper block 62A in a substantially hemispherical shape as illustrated in FIG. 8. The height of the bulging portion N is slightly larger than the level difference $\alpha$. Therefore, when the application table 62 is in the raised position (transfer position) and the strip F descends to a position where the lower surface of the strip F comes into contact with the upper surface 44A of the die plate 44, the bulging portion N of the adhesive agent B in each of the discharge holes 80 comes into contact with the lower surface of the strip F, and the adhesive agent B is transferred to each adhesive agent application region E in a substantially circular shape.

The transfer amount of the adhesive agent B on each adhesive agent application region E can be controlled in accordance with the size (volume) of the level difference $\alpha$ and the bulging portion N. The size of the bulging portion N is quantitatively determined in accordance with the pressure of the adhesive agent B in the adhesive agent accumulation portion 78, the viscosity of the adhesive agent B, the inner diameter of each discharge hole 80, and the like, and hence the transfer amount of the adhesive agent B on each adhesive agent application region E can be set to an optimal value by optimally setting these factors.

In the transfer-type application of the adhesive agent using the discharge holes 80 as above, the pitch between the adjacent discharge holes 80 can be made smaller than the pitch in the nozzle method using tubular bodies, whereby the pitch between the adjacent adhesive agent application regions E can be made small. As a result, even when the tooth portion 16 is small, the adhesive agent application regions E can be set in a plurality of positions of the tooth portion 16. This contributes to improving the bond strength of the tooth portion 16 in the lamination bonding of the plurality of divided core pieces 12.

When the application table 62 is in the lowered position (non-transfer position), the upper surface 62C of the upper block 62A is placed below the upper surface 44A of the die plate 44 by a large level difference that is larger than the level difference $\alpha$. As a result, the bulging portion N of the adhesive agent B having a defined size does not come into contact with the lower surface of the strip F, and the adhesive agent B is not transferred to the lower surface of the strip F. Therefore, the application table 62 only needs to be moved to the lowered position when forming a divided core piece for separation to set the number of the divided core pieces 12 to be stacked.

As shown in FIGS. 9(A) to (J), the shape of the adhesive agent application regions E and Ex on the divided core piece 12 may be a T-shape that matches the shape of the divided core piece 12, or may be other shapes such as an oval shape, an elliptic shape, etc. Further, the adhesive agent application regions E and Ex can be arranged in various ways as shown in FIGS. 9(A) to (J).

Each of adhesive agent application regions Ea of the divided core piece 12 shown in FIG. 9(D) does not include the outer shape contour, and in the adhesive agent application, the adhesive agent B on the adhesive agent application region Ea does not protrude outside the outer shape contour. However, in the second outer shape punching station VI, the adhesive agent B on the adhesive agent application region Ea may protrude outside the outer shape contour due to contact by the punch 34 for second outer shape punching.

Even in such a case, owing to the provision of the above-mentioned first outer shape punching step, the adhesion of the adhesive agent B to the die 50 for second outer shape punching is avoided, and thus, as in the above-described embodiment, the die 50 for second outer shape punching is not contaminated by the adhesive agent B.

Figure 10:
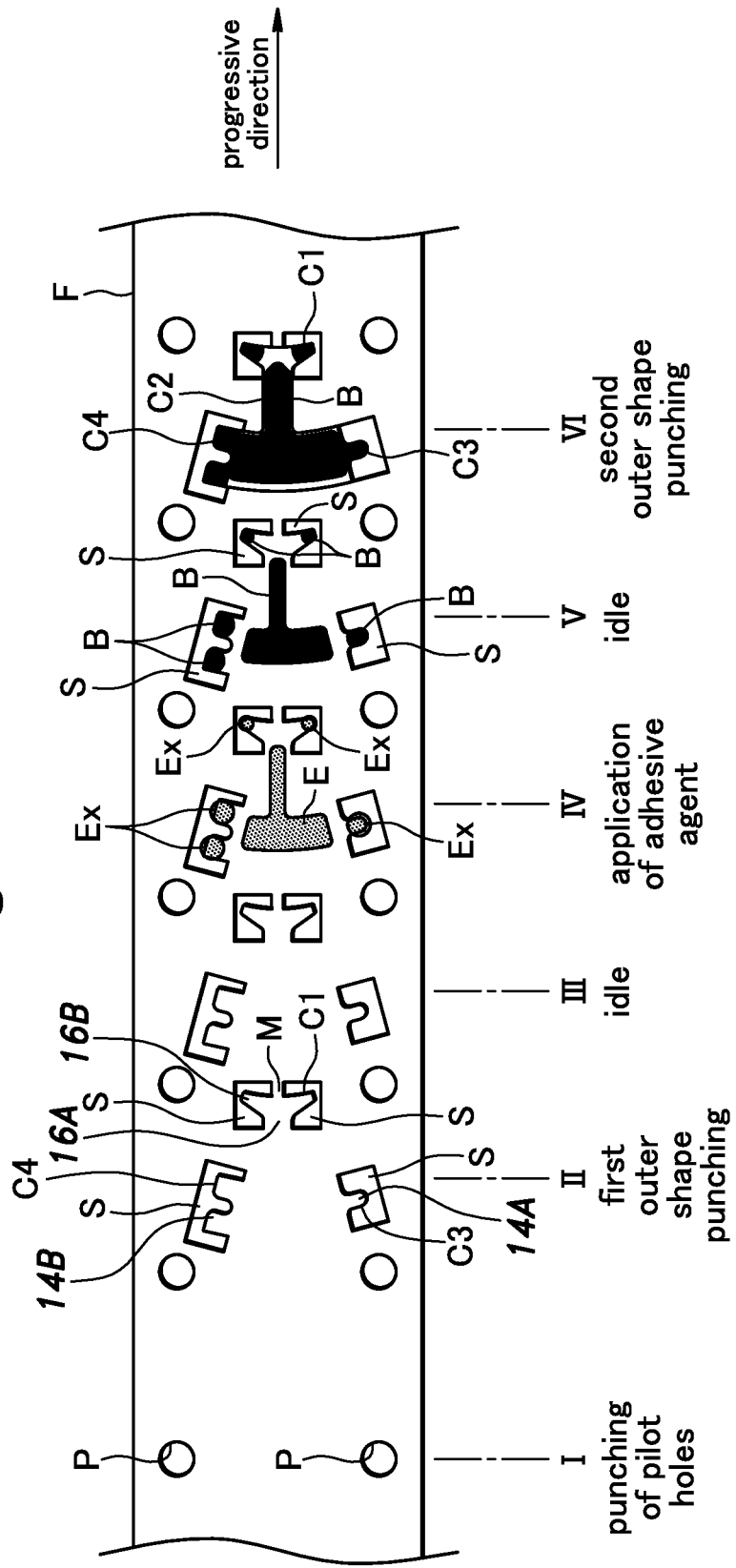
FIG. 10 is an explanatory diagram showing a manufacturing process of a laminated iron core according to another embodiment.

Next, a manufacturing process of the divided core piece 12 in which the shapes and positions of the adhesive agent application regions E and Ex are set as shown in FIG. 9(H) will be described with reference to FIG. 10.

In this embodiment, the adhesive agent application regions Ex each including the outer shape contour of the divided core piece 12 are set on the projection 14A and the recess 14B of the yoke portion 14 in addition to the tips of the circumferentially extending portion 16B.

In accordance with this, in the first outer shape punching step in the first outer shape punching station II, portions corresponding to the outer shape C3 of the projection 14A and the outer shape C4 of the recess 14B are punched in the strip F in addition to the portion corresponding to the outer shape C1 of the circumferentially extending portion 16B and the part of the radially extending portion 16A adjacent thereto.

By this punching, prior to the adhesive agent applying step, spaces S are formed in the strip F on the outside of the portions corresponding to the projection 14A and the recess 14B in addition to on the outside of the portion corresponding to the circumferentially extending portion 16B and the part of the radially extending portion 16A adjacent thereto.

Figure 11:
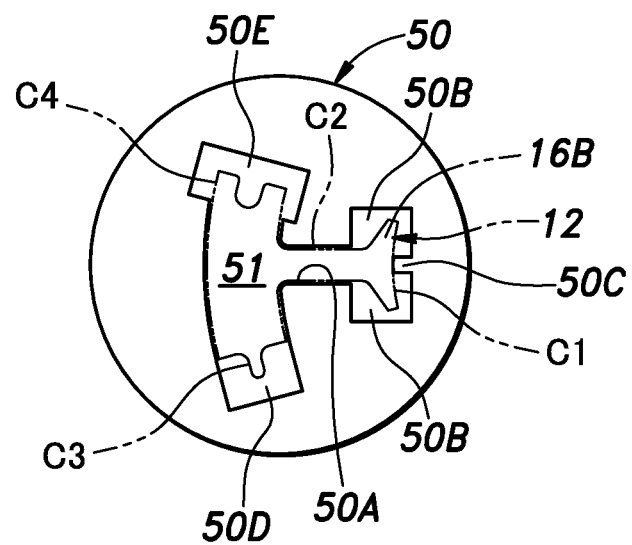
FIG. 11 is a plan view of a die for second outer shape punching used in the manufacturing apparatus according to the other embodiment.

As shown in FIG. 11, in plan view, the die 50 for second outer shape punching in this embodiment is provided, in a portion thereof defining the outer edge of the die hole 51, with a blade portion 50A having the same shape as the outer shape contour of the divided core piece 12 other than the outer shapes C1, C3, and C4, recesses (non-blade portions) 50B set at positions corresponding to the spaces S on the outside of the outer shape C1, a blade portion 50C protruding into the die hole 51 to cut the bridge portion M, a recess (non-blade portion) 50D provided at a position corresponding to the space S on the outside of the outer shape C3, and a recess (the non-blade portion) 50E provided at a position corresponding to the space S on the outside of the outer shape C4.

Since the punch 34 for second outer shape punching and the die 50 for second outer shape punching are only required to punch the outer shape C2 of the divided core piece 12 excluding the outer shapes C1, C3, and C4, portions of the die 50 for second outer shape punching corresponding to the outer shapes C1, C3, and C4 are spaced from the outer shapes C1 C3, and C4 by the spaces S due to the recesses 50B, 50D, and 50E, respectively.

Thereby, in this embodiment also, even if the adhesive agent B transferred to the adhesive agent application regions Ex on the circumferentially extending portion 16B adheres to an end surface of a portion of the outer shapes C1, C3, C4 or protrudes outward from the outer edges of the circumferentially extending portion 16B, the projection 14A, and recess 14B, the adhesive agent B does not adhere to the die 50 for second outer shape punching, and the die 50 for second outer shape punching is not contaminated by the adhesive agent B.

Figure 12:
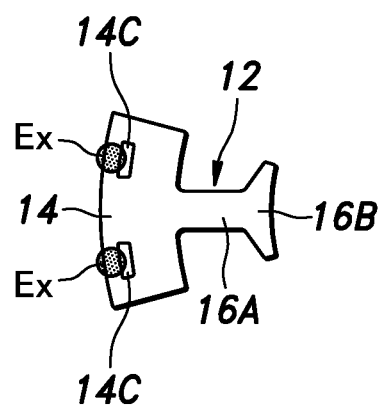
FIG. 12 is a plan view showing another embodiment of the divided core piece manufactured by the manufacturing apparatus according to the present invention.

Next, a manufacturing process of the divided core piece 12 in which the shapes and positions of the adhesive agent application regions Ex are set as shown in FIG. 12 will be described with reference to FIG. 13.

The divided core piece 12 shown in FIG. 12 has slit-like openings 14C at two locations on the yoke portion 14 arranged in the circumferential direction. Between each opening 14C and the outer edge of the yoke portion 14, an adhesive agent application region Ex that includes the outer shape contour of the divided core piece 12 and the opening edge of the opening 14C is set.

Figure 13:
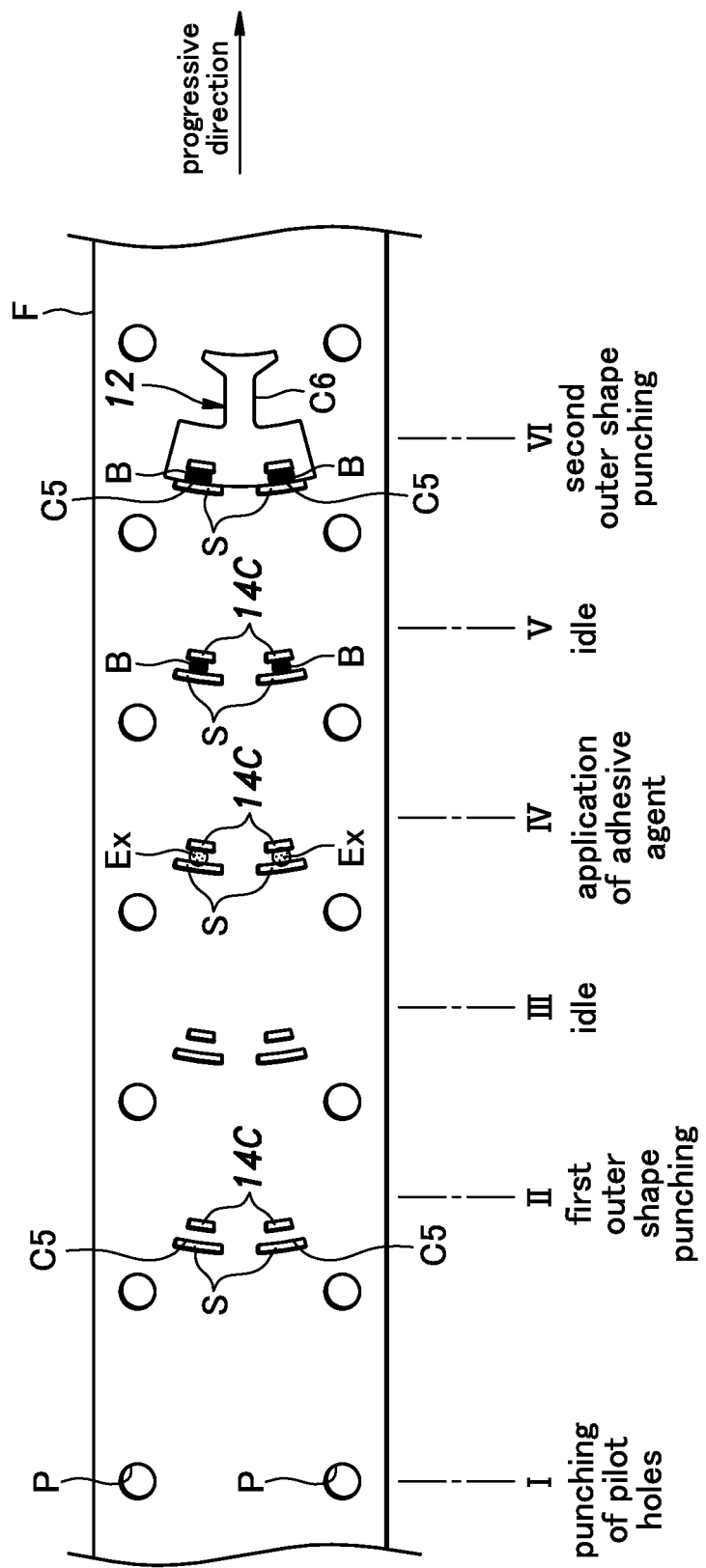
FIG. 13 is an explanatory diagram showing a manufacturing process of a laminated iron core according to the other embodiment.

As shown in FIG. 13, in the first outer shape punching station II, as the first outer shape punching step, the two openings 14C and parts on the outside of the outer edges of portions of the yoke portion 14 where the adhesive agent application regions Ex are set are punched in a slit-like shape, whereby portions corresponding to outer shapes C5 of the portions of the yoke portion 14 where the adhesive agent application regions Ex are set are formed in the strip F. By this punching, spaces S are formed in the strip F on the outside of the yoke portion 14 in correspondence with the respective adhesive agent application regions Ex.

In the adhesive agent applying station IV, as the adhesive agent applying step, the adhesive agent B is transferred to each adhesive agent application region Ex on the lower surface of the strip F in a substantially circular shape by the adhesive agent applying apparatus 60 in the raised position. Each adhesive agent application region Ex includes a portion protruding outside the outer shape contour of the yoke portion 14 and a portion protruding into the opening 14C, but the protruding portions are located in the corresponding space S or opening 14C and there is no application surface in these portions. Therefore, as shown in the idle station V, the transfer of the adhesive agent B to each adhesive agent application region Ex is not performed in the protruding portions and is performed in the portion between each opening 14C and the outer edge of the yoke portion 14.

In the second outer shape punching station VI, as the second outer shape punching step, an entirety of an outer shape C6 of the divided core piece 12 other than the outer shapes C5 is punched out. Thereby, the divided core piece 12 is separated from the strip F.

Figure 14:
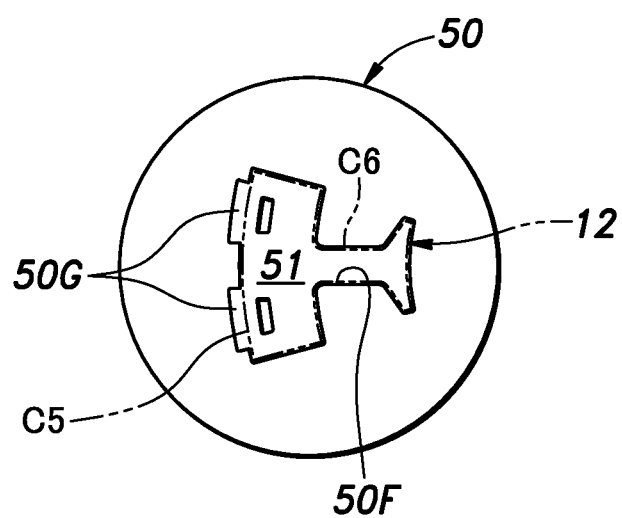
FIG. 14 is a plan view of a die for second outer shape punching used in the manufacturing apparatus according to the other embodiment.

As shown in FIG. 14, in plan view, the die 50 for second outer shape punching used in the second outer shape punching step is provided, in a portion thereof defining the outer edge of the die hole 51, with a blade portion 50F having the same shape as the outer shape C6 of the part of the divided core piece 12 other than the outer shapes C5 and recesses (non-blade portions) 50G provided at positions corresponding to the spaces S on the outside of the outer shapes C5.

Since the punch 34 for second outer shape punching and the die 50 for second outer shape punching are only required to punch the outer shape C6 of the divided core piece 12 excluding the outer shapes C5, portions of the die 50 for second outer shape punching corresponding to the outer shapes C5 are spaced from the outer shapes C5 by the spaces S due to the recesses 50G.

Thereby, even if the adhesive agent B transferred to the adhesive agent application regions Ex on the yoke portion 14 adheres to an end surface of a portion of the outer shapes C5 or protrudes outward from the outer edge of the yoke portion 14, the adhesive agent B does not adhere to the die 50 for second outer shape punching, and the die 50 for second outer shape punching is not contaminated by the adhesive agent B.

Figure 15:
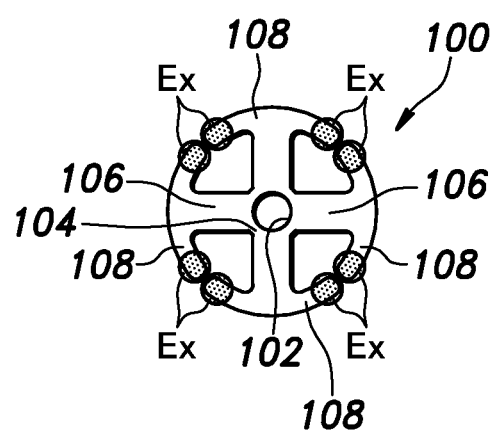
FIG. 15 is a plan view showing another embodiment of an iron core lamina manufactured by the manufacturing apparatus according to the present invention.

Next, a manufacturing process of an iron core lamina 100 for a rotor in which the shapes and positions of the adhesive agent application regions Ex are set as shown in FIG. 15 will be described with reference to FIG. 16.

As shown in FIG. 15, the iron core lamina 100 includes s central portion 104 having s central hole 102, four protruding pole portions 106 extending radially outward from the central portion 104, and magnetic pole portions 108 each extending circumferentially in an arc shape from the tip of an associated one of the protruding pole portions 106. The adhesive agent application regions Ex are set at the tips of each of the magnetic pole portions 108.

Figure 16:
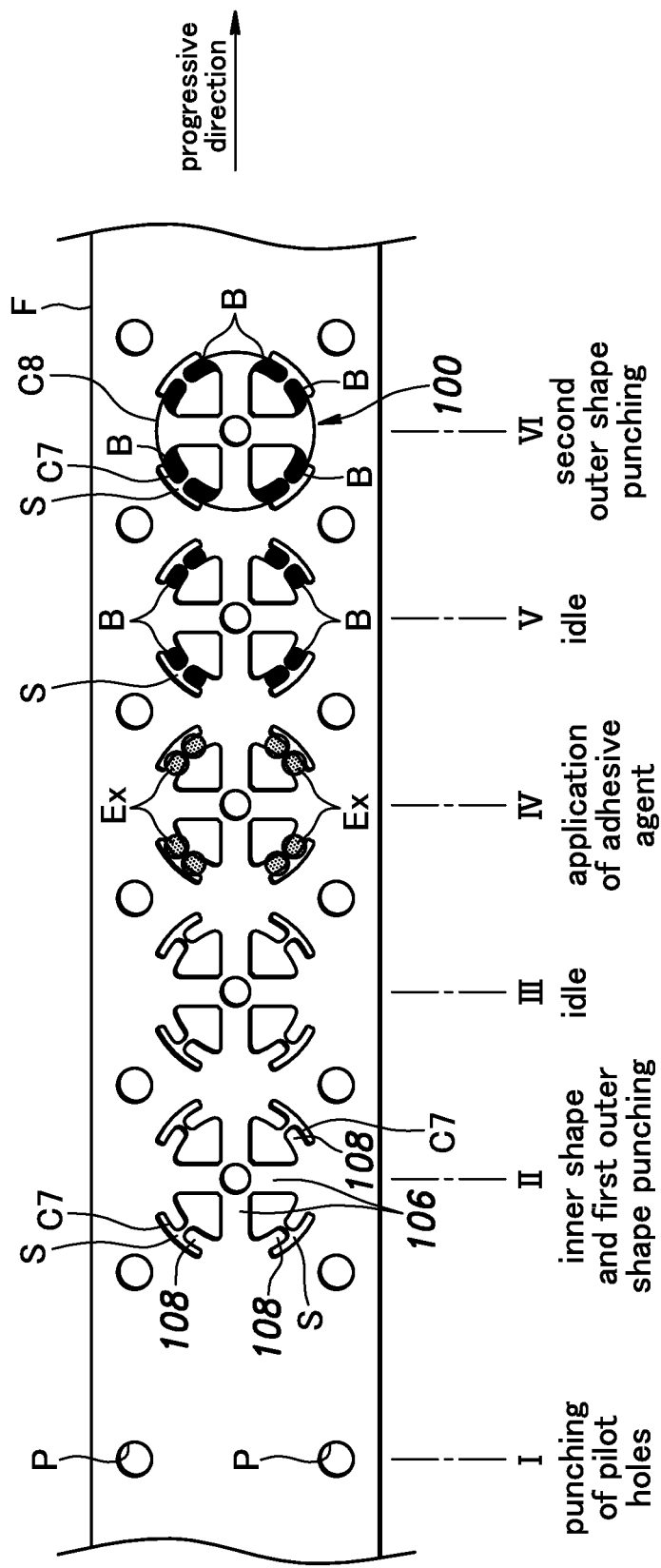
FIG. 16 is an explanatory diagram showing a manufacturing process of a laminated iron core according to the other embodiment.

In the present embodiment, as shown in FIG. 16, a pilot hole punching station I, an inner shape/first outer shape punching station II, an idle station III, an adhesive agent applying station IV, an idle station V, and a second outer shape punching station VI are arranged in order in the progressive direction.

In the inner shape/first outer shape punching station II, the central hole 102 and the inner shape of each protruding pole portion 106 and each magnetic pole portion 108 are punched out, and as the first outer shape punching step, a part on the outside of the outer edge of each magnetic pole portion 108 is punched out in a slit-like shape to form a portion corresponding to an outer shape C7 of a portion of each magnetic pole portion 108 where the adhesive agent application region Ex is set. By this punching, spaces S are formed in the strip F on the outside of the respective magnetic pole portions 108 in correspondence with the respective adhesive agent application regions Ex.

In the adhesive agent applying station IV, as the adhesive agent applying step, the adhesive agent B is transferred to each adhesive agent application region Ex on the lower surface of the strip F in a substantially circular shape by the adhesive agent applying apparatus 60 in the raised position. Each adhesive agent application region Ex includes a portion protruding outside the outer shape contour of the associated magnetic pole portion 108, but the protruding portion is located in the corresponding space S or the inner shape punching portion (space) on the inside of the magnetic pole portion 108 and there is no application surface in this portion. Therefore, as shown in the idle station V, the transfer of the adhesive agent B to each adhesive agent application region Ex is not performed in the protruding portion and is performed on the magnetic pole portion 108.

In the second outer shape punching station VI, as the second outer shape punching step, an entirety of an outer shape C8 of the iron core lamina 100 other than the outer shapes C7 is punched out. Thereby, the iron core lamina 100 is separated from the strip F.

Figure 17:
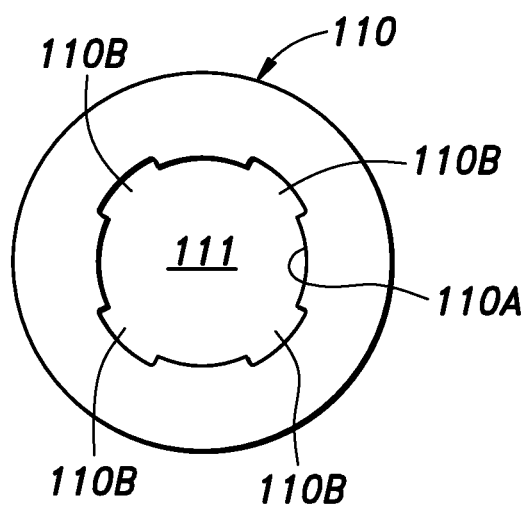
FIG. 17 is a plan view of a die for second outer shape punching used in the manufacturing apparatus according to the other embodiment.

As shown in FIG. 17, in plan view, a die 110 for second outer shape punching used in the second outer shape punching step is provided, in a portion thereof defining an outer edge of a die hole 111, with a blade portion 110A having the same shape as the outer shape C8 of the iron core lamina 100 and recesses (non-blade portions) 110B provided at positions corresponding to the spaces S on the outside of the outer shapes C7.

Since the die 110 for second outer shape punching is only required to punch the outer shape C8 of the iron core lamina 100 excluding the outer shapes C7, portions of the die 110 for second outer shape punching corresponding to the outer shapes C7 are spaced from the outer shapes C7 by the spaces S due to the recess 110B.

Thereby, even if the adhesive agent B transferred to the adhesive agent application region Ex on each of the magnetic pole portions 108 adheres to an end surface of a portion of the outer shape C7 or protrudes outward from the outer edge of the magnetic pole portion 108, the adhesive agent B does not adhere to the die 110 for second outer shape punching, and the die 110 for second outer shape punching is not contaminated by the adhesive agent B.

Figure 18:
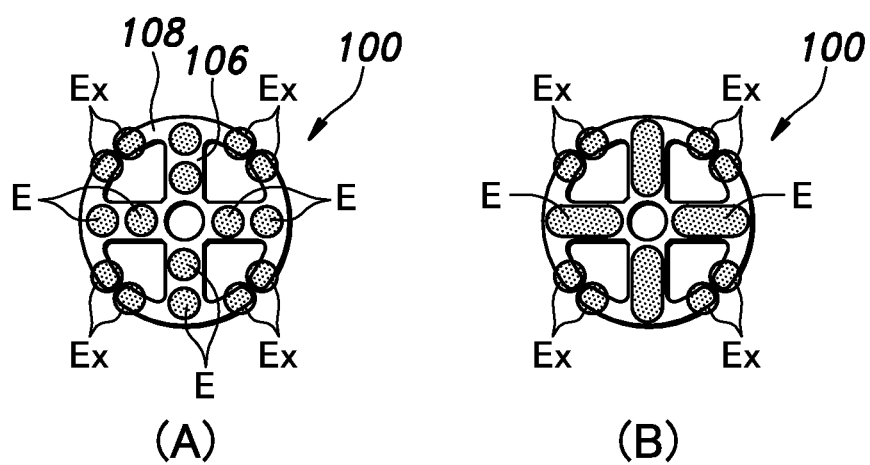
FIG. 18 includes plan views showing examples of setting of the adhesive agent application regions in the laminated iron core.

The shape of the adhesive agent application regions E and Ex on the iron core lamina 100 may be an oval shape or the like other than a circular shape, as shown in FIGS. 18(A) and 18(B). Further, the adhesive agent application regions E can be arranged in various ways, as shown in FIGS. 18(A) and 18(B).

Figure 19:
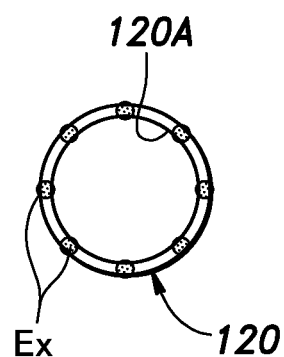
FIG. 19 is a plan view showing another embodiment of the iron core lamina manufactured by the manufacturing apparatus according to the present invention.

Next, a manufacturing process of an annular iron core lamina 120 in which the shapes and positions of the adhesive agent application regions Ex are set as shown in FIG. 19 will be described with reference to FIG. 20.

As shown in FIG. 19, the iron core lamina 120 has an annular shape, and the adhesive agent application regions Ex are set at multiple positions in the circumferential direction.

Figure 20:
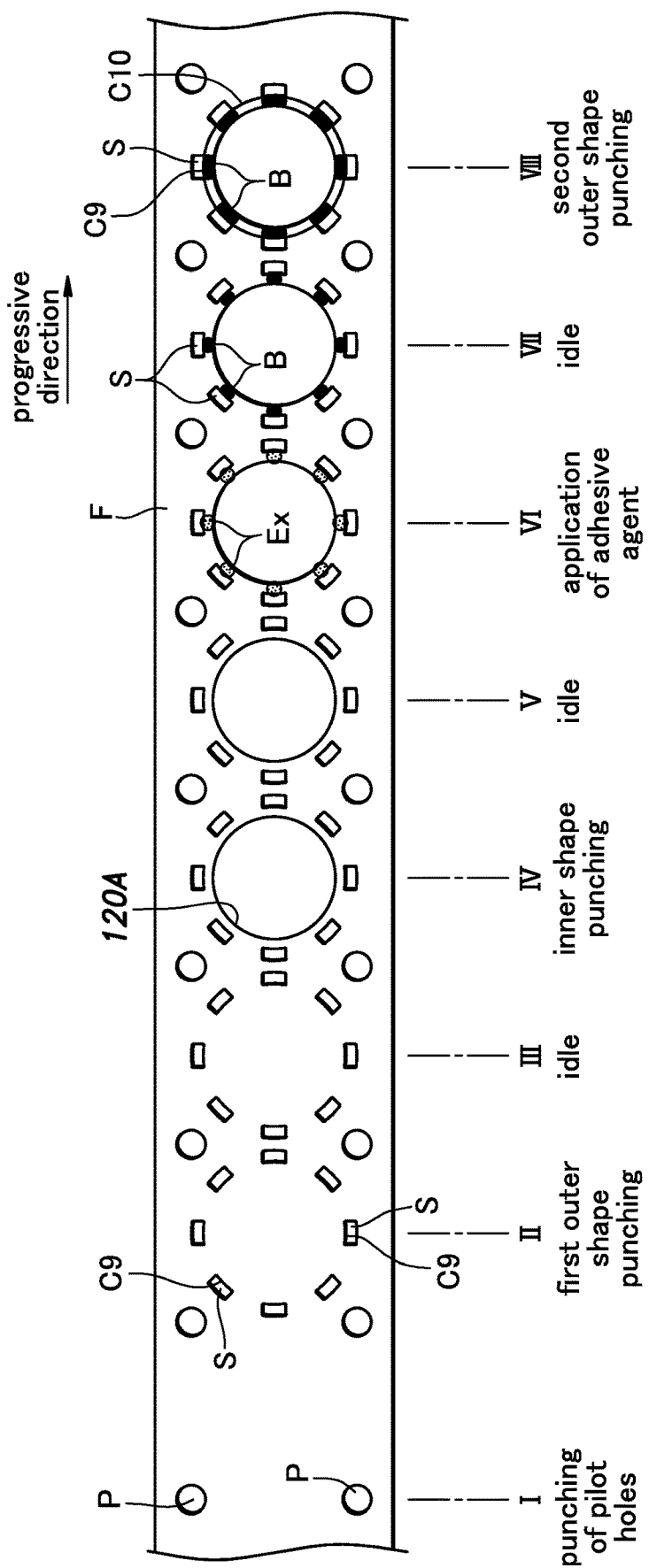
FIG. 20 is an explanatory diagram showing a manufacturing process of a laminated iron core according to the other embodiment.

In the present embodiment, as shown in FIG. 20, s pilot hole punching station I, s first outer shape punching station II, an idle station III, an inner shape punching station IV, an idle station V, an adhesive agent applying station VI, an idle station VII, and a second outer shape punching station VIII are arranged in order in the progressive direction.

In the first outer shape punching station II, as the first outer shape punching step, parts on the outside of the portions corresponding to the respective adhesive agent application regions Ex are punched out in a substantially rectangular shape to form portions corresponding to outer shapes C9 of the portions where the respective adhesive agent application regions Ex are set.

By this punching, prior to the adhesive agent applying step, spaces S are formed in the strip F on the outside of the portion corresponding to the iron core lamina 120 in correspondence with the respective adhesive agent application regions Ex.

At the inner shape punching station IV, an inner shape 120A of the iron core lamina 120 is punched out.

In the adhesive agent applying station VI, as the adhesive agent applying step, the adhesive agent B is transferred to each adhesive agent application region Ex on the lower surface of the strip F in a substantially circular shape by the adhesive agent applying apparatus 60 in the raised position. Each adhesive agent application region Ex includes portions protruding outside the outer shape contour and the inner shape contour of the iron core lamina 120, but the protruding portions are located in the corresponding space S or the inner part (space) of the iron core lamina 120 and there is no application surface in these portions. Therefore, as shown in the idle station VII, the transfer of the adhesive agent B to each adhesive agent application region Ex is not performed in the protruding portions and is performed on the iron core lamina 120.

In the second outer shape punching station VIII, as the second outer shape punching step, an entirety of an outer shape C10 of the iron core lamina 120 other than the outer shapes C9 is punched out. Thereby, the iron core lamina 120 is separated from the strip F.

Figure 21:
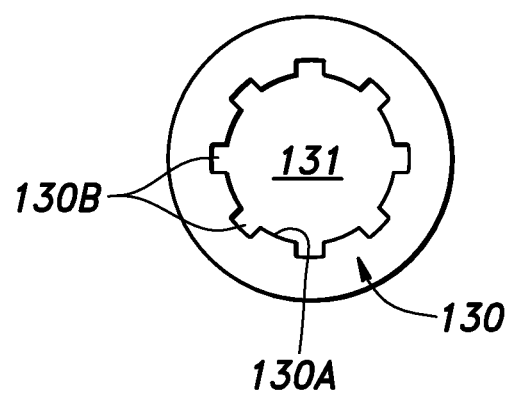
FIG. 21 is a plan view of a die for second outer shape punching used in the manufacturing apparatus according to the other embodiment.

As shown in FIG. 21, in plan view, a die 130 for second outer shape punching used in the second outer shape punching step is provided, in a portion thereof defining an outer edge of a die hole 131, with a blade portion 130A having the same shape as the outer shape C10 of the iron core lamina 120 and recesses (non-blade portions) 130B provided at positions corresponding to the spaces S on the outside of the outer shapes C9.

Since the die 130 for second outer shape punching is only required to punch the outer shape C10 of the iron core lamina 120 excluding the outer shapes C9, portions of the die 130 for second outer shape punching corresponding to the outer shapes C9 are spaced from the outer shapes C9 by the spaces S due to the recesses 130B.

Thereby, even if the adhesive agent B transferred to the adhesive agent application regions Ex adheres to an end surface of a portion of the outer shapes C9 or protrudes outward from the outer edge of the iron core lamina 120, the adhesive agent B does not adhere to the die 130 for second outer shape punching, and the die 130 for second outer shape punching is not contaminated by the adhesive agent B.

Figure 22:
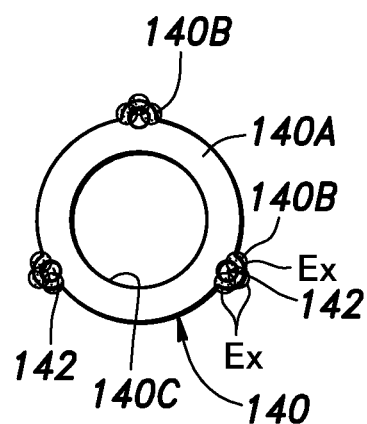
FIG. 22 is a plan view showing another embodiment of the iron core lamina manufactured by the manufacturing apparatus according to the present invention.

Next, a manufacturing process of an annular core iron lamina 140 in which the shapes and positions of the adhesive agent application regions Ex are set as shown in FIG. 22 will be described with reference to FIG. 23.

As shown in FIG. 22, the iron core lamina 140 has an annular main portion 140A and semi-circular protrusions 140B protruding outward from multiple portions of the main portion 140A, and a through hole 142 is formed in each protrusion 140B. The adhesive agent application regions Ex are set on each protrusion 140B.

Figure 23:
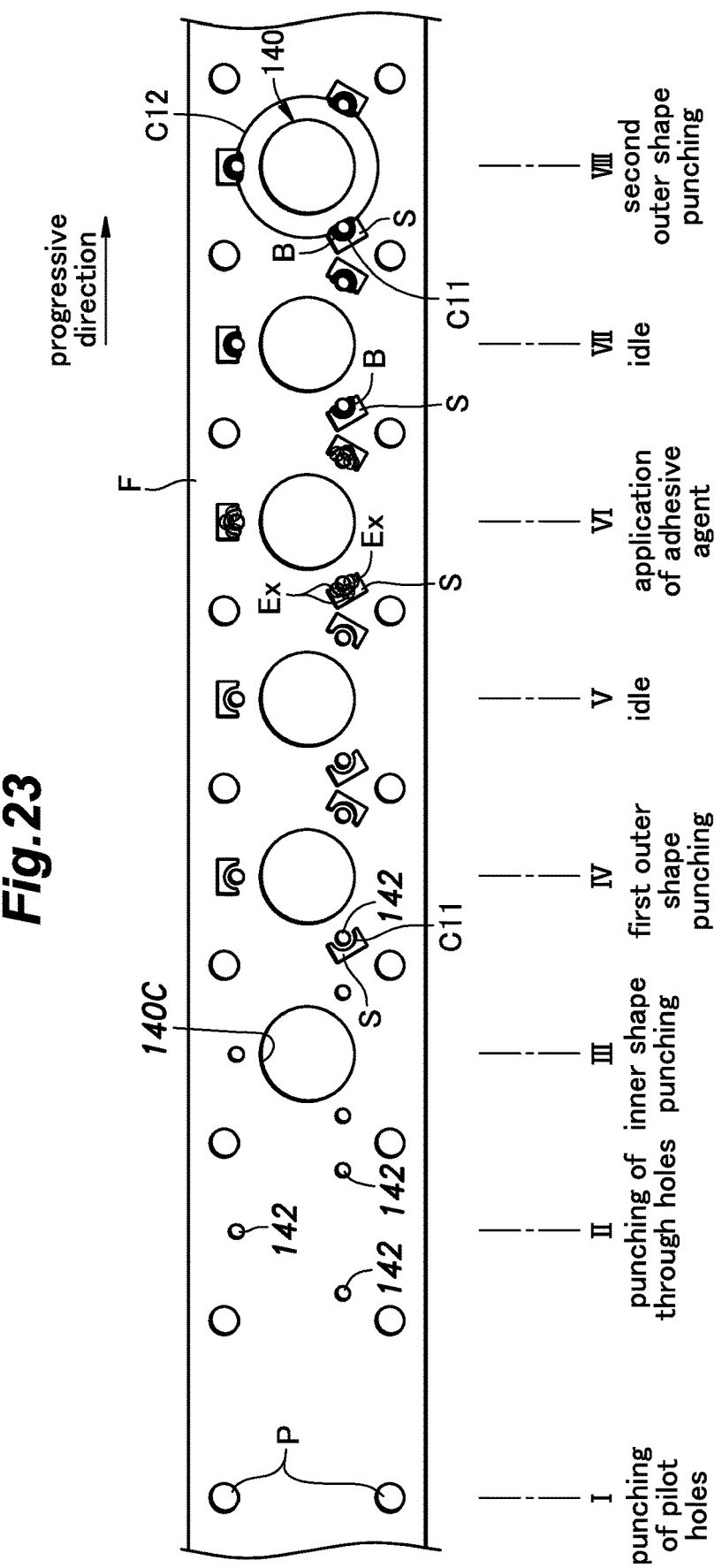
FIG. 23 is an explanatory diagram showing a manufacturing process of a laminated iron core according to the other embodiment.

In the present embodiment, as shown in FIG. 23, a pilot hole punching station I, a through hole punching station II, an inner shape punching station III, a first outer shape punching station IV, an idle station V, an adhesive agent applying station VI, an idle station VII, and a second outer shape punching station VIII are arranged in order in the progressive direction.

In the through hole punching station II, the through holes 142 are punched out.

In the inner shape punching station III, an inner shape 140C of the iron core lamina 140 is punched out.

In the first outer shape punching station IV, as the first outer shape punching step, portions corresponding to the respective adhesive agent application regions Ex, in other words, portions surrounding the outside of the respective protrusions 140B are punched out to form portions corresponding to outer shapes C11 of the portions where the adhesive agent application region Ex are set.

By this punching, prior to the adhesive agent applying step, spaces S are formed in the strip F on the outside of the portion corresponding to the iron core lamina 140 in correspondence with the respective adhesive agent application regions Ex.

In the adhesive agent applying station VI, as the adhesive agent applying step, the adhesive agent B is transferred to each adhesive agent application region Ex on the lower surface of the strip F in a substantially circular shape by the adhesive agent applying apparatus 60 in the raised position.

Each adhesive agent application region Ex includes a portion protruding outside the outer shape contour of the corresponding protrusion 140B and a portion protruding into the corresponding through hole 142, but the protruding portions are located in the corresponding space S or through hole 142 (space) and there is no application surface in these portions. Therefore, as shown in the idle station VII, the transfer of the adhesive agent B to each adhesive agent application region Ex is not performed in the protruding portions and is performed on the protrusion 140B.

In the second outer shape punching station VIII, as the second outer shape punching step, an entirety of an outer shape C12 of the iron core lamina 140 other than the outer shapes C11 is punched out. Thereby, the iron core lamina 140 is separated from the strip F.

Figure 24:
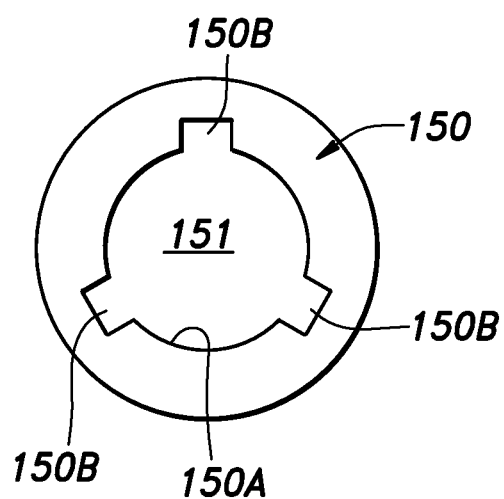
FIG. 24 is a plan view of a die for second outer shape punching used in the manufacturing apparatus according to the other embodiment.

As shown in FIG. 24, in plan view, a die 150 for second outer shape punching used in the second outer shape punching step is provided, in a portion thereof defining an outer edge of a die hole 151, with a blade portion 150A having the same shape as the outer shape C12 of the iron core lamina 140 and recesses (non-blade portions) 150B provided at positions corresponding to the spaces S on the outside of the outer shapes C11.

Since the die 150 for second outer shape punching is only required to punch the outer shape C12 of the iron core lamina 140 excluding the outer shapes C11, portions of the die 150 for second outer shape punching corresponding to the outer shapes C11 are spaced from the outer shapes C11 by the spaces S due to the recesses 150B.

Thereby, even if the adhesive agent B transferred to the adhesive agent application regions Ex adheres to an end surface of a portion of the outer shapes C11 or protrudes outward from the outer edge of any protrusion 140B, the adhesive agent B does not adhere to the die 150 for second outer shape punching, and the die 150 for second outer shape punching is not contaminated by the adhesive agent B.

Figure 25:
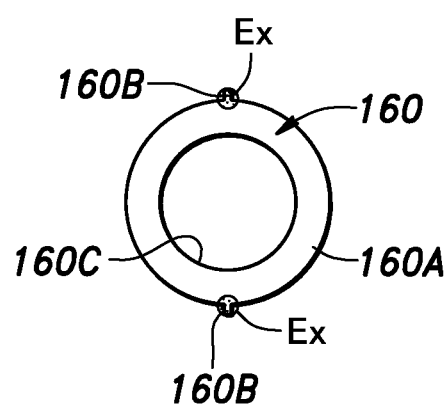
FIG. 25 is a plan view showing another embodiment of the iron core lamina manufactured by the manufacturing apparatus according to the present invention.

Next, a manufacturing process of an annular iron core lamina 160 in which the shapes and positions of the adhesive agent application regions Ex are set as shown in FIG. 25 will be described with reference to FIG. 26.

As shown in FIG. 25, the iron core lamina 160 has an annular main portion 160A and rectangular protrusions 160B protruding outward from multiple portions of the main portion 160A. The adhesive agent application regions Ex are set on the respective protrusions 160B.

Figure 26:
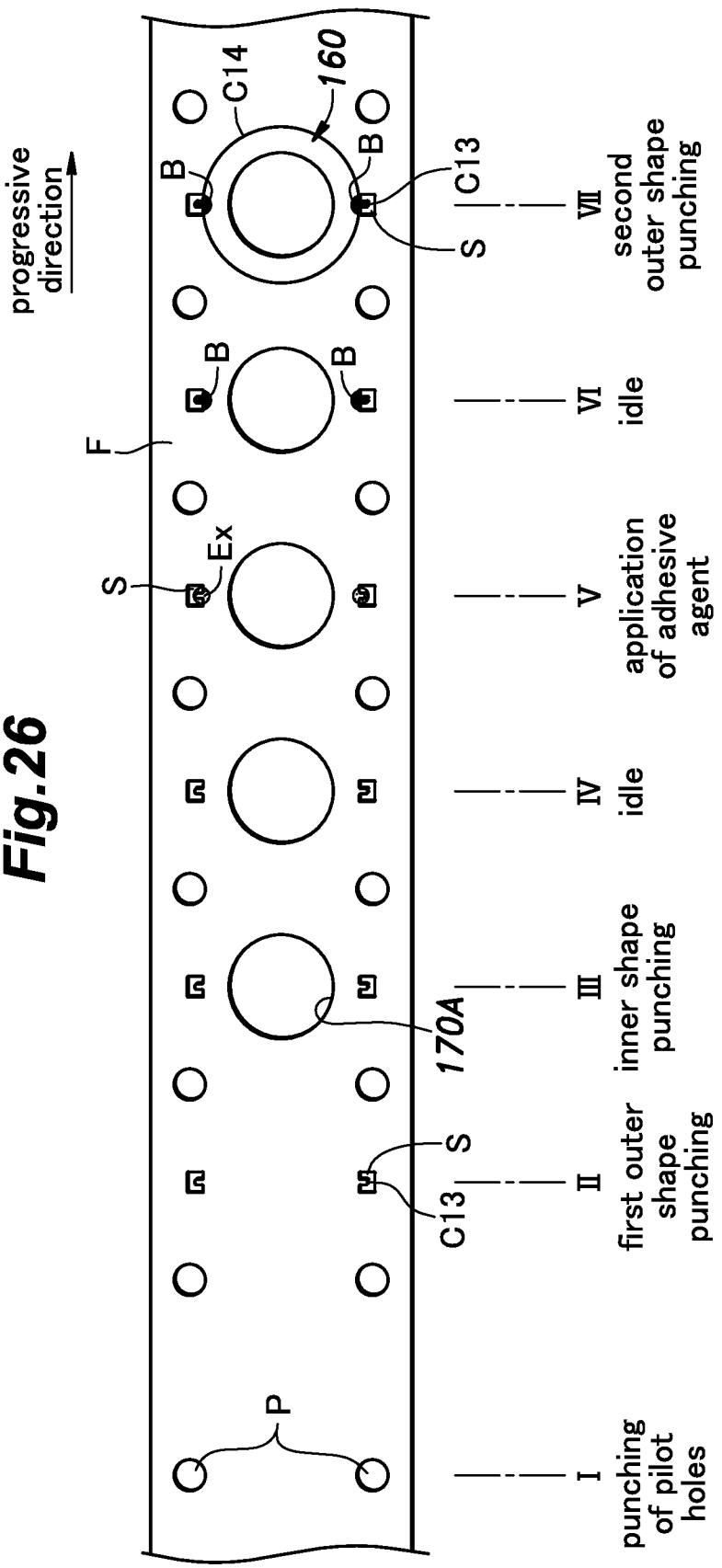
FIG. 26 is an explanatory diagram showing a manufacturing process of a laminated iron core according to the other embodiment.

In the present embodiment, as shown in FIG. 26, a pilot hole punching station I, a first outer shape punching station II, an inner shape punching station III, an idle station IV, an adhesive agent applying station V, an idle station VI, and a second outer shape punching station VII are arranged in order in the progressive direction.

In the first outer shape punching station II, as the first outer shape punching step, portions corresponding to the respective adhesive agent application regions Ex, in other words, portions surrounding the outside of the respective protrusions 160B are punched out to form portions corresponding to outer shapes C13 of the portions where the adhesive agent application regions Ex are set.

By this punching, prior to the adhesive agent applying step, spaces S are formed in the strip F on the outside of the portion corresponding to the iron core lamina 160 in correspondence with the respective adhesive agent application regions Ex.

In the inner shape punching station III, an inner shape 160C of the iron core lamina 160 is punched out.

In the adhesive agent applying station V, as the adhesive agent applying step, the adhesive agent B is transferred to each adhesive agent application region Ex on the lower surface of the strip F in a substantially circular shape by the adhesive agent applying apparatus 60 in the raised position. Each adhesive agent application region Ex includes a portion protruding outside the outer shape contour of the corresponding protrusion 160B, but the protruding portion is located in the corresponding space S and there is no application surface in this portion. Therefore, as shown in the idle station VI, the transfer of the adhesive agent B to each adhesive agent application region Ex is not performed in the protruding portion and is performed on the protrusion 160B.

In the second outer shape punching station VII, as the second outer shape punching step, an entirety of an outer shape C14 of the iron core lamina 160 other than the outer shapes C13 is punched out. Thereby, the iron core lamina 160 is separated from the strip F.

Figure 27:
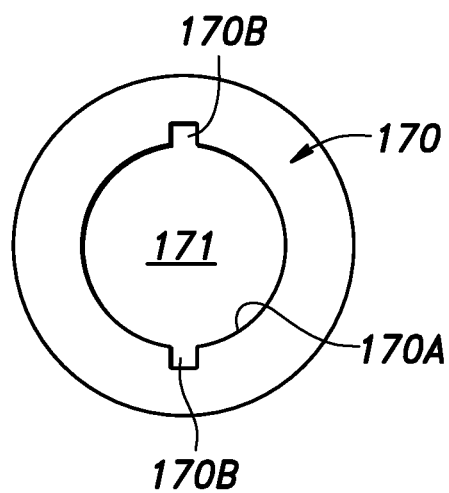
FIG. 27 is a plan view of a die for second outer shape punching used in the manufacturing apparatus according to the other embodiment.

As shown in FIG. 27, in plan view, a die 170 for second outer shape punching used in the second outer shape punching step is provided, in a portion thereof defining an outer edge of a die hole 171, with a blade portion 170A having the same shape as the outer shape C14 of the iron core lamina 160 and recesses (non-blade portions) 170B provided at positions corresponding to the spaces S on the outside of the outer shapes C13.

Since the die 170 for second outer shape punching is only required to punch the outer shape C14 of the iron core lamina 160 excluding the outer shapes C13. portions of the die 170 for second outer shape punching corresponding to the outer shapes C13 are spaced from the outer shapes C13 by the spaces S due to the recesses 170B.

Thereby, even if the adhesive agent B transferred to the adhesive agent application regions Ex adheres to an end surface of a portion of the outer shapes C13 or protrudes outward from the outer edge of any protrusion 160B, the adhesive agent B does not adhere to the die 170 for second outer shape punching, and the die 170 for second outer shape punching is not contaminated by the adhesive agent B.

The present invention has been described above with reference to the preferred embodiments thereof. However, the present invention is not limited to such embodiments and can be appropriately modified without departing from the spirit of the present invention.

In the above embodiment, the application of the adhesive agent B to the strip F is performed such that the adhesive agent B is applied to the lower surface of the strip F from below the strip F, but the adhesive agent B may be applied to the upper surface of the strip F from above the strip F. The application of the adhesive agent B to the strip F is not limited to transferring, and may be performed by a jet method, a dispenser method method, a silk screen method, a roll transfer method, or a stamp method using a porous member. Also, it may be a contact type or a non-contact type.

Further, not all of the components shown in the above embodiments are necessarily essential, and they can be selectively adopted as appropriate without departing from the spirit of the present invention.

Glossary

10: laminated iron core
12: divided core piece (iron core lamina)
14: yoke portion
14A: projection
14B: recess
16: tooth portion
16A: radially extending portion
16B: circumferentially extending portion
20: manufacturing apparatus
22: upper die holder
24: lower die holder
26: back plate
28: punch plate
30: punch for pilot hole punching
34: punch for second outer shape punching (second punch)
36: stripper plate
36A: recess
38: punch hole
40: punch hole
42: punch hole
44: die plate
44A: upper surface
46: die for pilot hole punching
48: die for first outer shape punching (first die)
50: die for second outer shape punching (second die)
50A: blade portion
50B: recess
50C: blade portion
50D: recess
50E: recess
50F: blade portion
50G: recess
51: die hole
52: squeeze ring
52A: divided core piece holding portion
52B: recess
53: squeeze hole
60: adhesive agent applying apparatus
62: application table
62A: upper block
62B: lower block
62C: upper surface
64: cam mechanism
66: driving apparatus
68: holding hole
74: fixed cam
74A: sawtooth protrusion
74B: sawtooth recess
76: moving cam
76A: sawtooth protrusion
76B: sawtooth recess
78: adhesive agent accumulation portion
80: discharge hole
82: inner block
84: adhesive agent supplying passage
86: adhesive agent supplying passage
88: adhesive agent supplying tube
90: adhesive agent supplying apparatus
100: iron core lamina
102: central hole
104: central portion
106: protruding pole portion
108: magnetic pole portion
110: die for second outer shape punching
110A: blade portion
110B: recess
111: die hole
120: iron core lamina
120A: inner shape
130: die for second outer shape punching
130A: blade portion
130B: recess
131: die hole
140: iron core lamina 140A: main portion
140B: protrusion
140C: inner shape
142: through hole
150: die for second outer shape punching
150A: blade portion
150B: recess
151: die hole
160: iron core lamina
160A: main portion
160B: protrusion
160C: inner shape
170: die for second outer shape punching
170A: blade portion
170B: recess
171: die hole
B: adhesive agent
C1-C14: outer shape
E: adhesive agent application region
Ex: adhesive agent application region
F: strip
M: bridge portion
N: bulging portion
P: pilot hole
S: space
α: step

The invention claimed is:

1. A manufacturing apparatus for a laminated iron core formed by stacking and adhesively bonding iron core laminae, each iron core lamina formed by punching an intermittently conveyed sheet steel strip into a predetermined shape, the manufacturing apparatus comprising:
   a first punch and a first die configured to punch a part of an outer shape of each iron core lamina in the sheet steel strip;
   an adhesive applicator configured to apply an adhesive agent on an adhesive agent application region including a portion defined in the sheet steel strip by punching by the first punch and the first die; and
   a second punch and a second die configured to punch the outer shape of each iron core lamina other than the part punched by the first punch and the first die from the sheet steel strip, the second die being provided with a blade portion having a same shape as the outer shape of each iron core lamina other than the part punched by the first punch and the first die,
   wherein the second die has a die hole, the die hole being provided, in a portion thereof corresponding to the part of the outer shape of the iron core lamina punched by the first punch and the first die, with a recess for defining a space between the part of the outer shape punched by the first punch and the first die and the second die as seen in a plan view from above the second die, the recess forming a non-blade portion of the second die,
   the second die is arranged below the second punch,
   the manufacturing apparatus further comprises a squeeze ring arranged below the second die to hold the iron core laminae punched by the second punch and the second die in a stacked state, and
   the squeeze ring has a squeeze hole, the squeeze hole being provided, in a portion thereof corresponding to the part of the outer shape of each iron core lamina punched by the first punch and the first die, with a recess for defining a space between the part of the outer shape punched by the first punch and the first die and the squeeze ring as seen in a plan view from above the squeeze ring.

2. The manufacturing apparatus for a laminated iron core according to claim 1, wherein the adhesive agent application region includes a contour of the outer shape of each iron core lamina, and
   the first punch and the first die are configured to punch a part of the outer shape of each iron core lamina adjacent to the adhesive agent application region.

3. The manufacturing apparatus for a laminated iron core according to claim 2, further comprising a stripper plate configured to come into contact with an upper surface of the sheet steel strip to perform a stripping action, wherein the stripper plate has a recess formed at a position corresponding to the adhesive agent application region of the sheet steel strip.

4. The manufacturing apparatus for a laminated iron core according to claim 1, further comprising a stripper plate configured to come into contact with an upper surface of the sheet steel strip to perform a stripping action, wherein the stripper plate has a recess formed at a position corresponding to the adhesive agent application region of the sheet steel strip.

5. A manufacturing method for a laminated iron core formed by stacking and adhesively bonding iron core laminae, each iron core lamina formed by punching an intermittently conveyed sheet steel strip into a predetermined shape, the manufacturing method comprising:
   a first outer shape punching step of punching a part of an outer shape of each iron core lamina in the sheet steel strip with a die set;
   an adhesive agent applying step of applying an adhesive agent on an adhesive agent application region including a portion defined in the sheet steel strip by punching by the first outer shape punching step; and
   a second outer shape punching step of, after the adhesive agent applying step, punching, with a die set, the outer shape of each iron core lamina other than the part punched by the first outer shape punching step from the sheet steel strip,
   wherein the die set used in the second outer shape punching step includes a punch and a die, and the die has a die hole and is provided with a blade portion having a same shape as the outer shape of each iron core lamina other than the part punched by the first outer shape punching step, the die hole being provided, in a portion thereof corresponding to the part of the outer shape of the iron core lamina punched by the first outer shape punching step, with a recess for defining a space between the part of the outer shape punched by the first outer shape punching step and the die as seen in a plan view from above the die, the recess forming a non-blade portion of the die,
   the die is arranged below the punch, and
   the manufacturing method further comprises a holding step of holding, with a squeeze ring arranged below the die, the iron core laminae punched by the second outer shape punching step in a stacked state,
   wherein the squeeze ring has a squeeze hole, the squeeze hole being provided, in a portion thereof corresponding to the part of the outer shape of each iron core lamina punched by the first outer shape punching step, with a recess for defining a space between the part of the outer shape punched by the first outer shape punching step and the squeeze ring as seen in a plan view from above the squeeze ring.

6. The manufacturing method for a laminated iron core according to claim 5, wherein the adhesive agent application region includes a contour of the outer shape of each iron core lamina, and the first outer shape punching step punches a part of the outer shape of each iron core lamina adjacent to the adhesive agent application region.

7. The manufacturing method for a laminated iron core according to claim 5, wherein the adhesive agent application region includes a part that protrudes outside the contour of the outer shape of each iron core lamina in the second outer shape punching step, and the first outer shape punching step punches a part of the outer shape of each iron core lamina adjacent to the adhesive agent application region.

\* \* \* \* \*